United States Patent
Nishitani et al.

(10) Patent No.: US 9,370,885 B2
(45) Date of Patent: Jun. 21, 2016

(54) IN-MOLD DECORATING METHOD AND IN-MOLD SYSTEM

(71) Applicant: Panasonic Corporation, Kadoma-shi, Osaka (JP)

(72) Inventors: Kenji Nishitani, Osaka (JP); Masahumi Kurisu, Osaka (JP); Masamitsu Miyazaki, Osaka (JP); Akira Ezaki, Osaka (JP); Guangri Pei, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 379 days.

(21) Appl. No.: 13/921,853

(22) Filed: Jun. 19, 2013

(65) Prior Publication Data

US 2013/0341830 A1 Dec. 26, 2013

(30) Foreign Application Priority Data

Jun. 20, 2012 (JP) .................................. 2012-138275

(51) Int. Cl.
*B29C 45/00* (2006.01)
*B29C 45/33* (2006.01)
*B29C 45/14* (2006.01)
*B29C 45/44* (2006.01)
*B29C 45/40* (2006.01)

(52) U.S. Cl.
CPC ....... *B29C 45/0053* (2013.01); *B29C 45/14196* (2013.01); *B29C 45/14827* (2013.01); *B29C 45/33* (2013.01); *B29C 2045/0058* (2013.01); *B29C 2045/1477* (2013.01); *B29C 2045/14204* (2013.01); *B29C 2045/4063* (2013.01); *B29C 2045/445* (2013.01); *B29C 2045/4492* (2013.01)

(58) Field of Classification Search
CPC .................... B29C 45/0053; B29C 45/14196; B29C 45/14827; B29C 45/33; B29C 2045/0058; B29C 2045/14204; B29C 2045/1477; B29C 2045/4063; B29C 2045/4492; B29C 2045/445
USPC .......................... 264/163, 259, 267, 293, 318
See application file for complete search history.

(56) References Cited

U.S. PATENT DOCUMENTS

| | | | |
|---|---|---|---|
| 2006/0222826 A1* | 10/2006 | Hamano | B29C 45/0025 428/195.1 |
| 2011/0003108 A1 | 1/2011 | Torimoto et al. | |
| 2012/0237702 A1* | 9/2012 | Kaneuchi | B29C 45/14827 428/32.69 |
| 2012/0315442 A1* | 12/2012 | Kaneuchi | B29C 45/1418 428/161 |

* cited by examiner

*Primary Examiner* — Alison L Hindenlang
*Assistant Examiner* — Lawrence D Hohenbrink, Jr.
(74) *Attorney, Agent, or Firm* — Hamre, Schumann, Mueller & Larson, P.C.

(57) ABSTRACT

A case molded article is molded by injecting resin into a molding space formed in an in-mold decoration die; meanwhile, foil is joined to the surface of the case molded article. After that, the foil is peeled off from the surface of the case molded article while leaving a pattern layer at least on the upper ends of the corners of the rising wall on the case molded article. Subsequently, the foil is peeled off from the surface of the case molded article while leaving the pattern layer at other points where the foil is joined to the surface of the case molded article.

7 Claims, 19 Drawing Sheets

IN-MOLD DECORATING METHOD AND IN-MOLD SYSTEM

The disclosure of Japanese Patent Application No. 2012-138275 filed Jun. 20, 2012 including specification, drawings and claims is incorporated herein by reference in its entirety.

BACKGROUND OF THE INVENTION

The present invention relates to an in-mold decorating method and an in-mold system in which in-mold foil including a layer having a printed design such as a color and a pattern and a base film having the layer thereon is attached into a cavity, and then molten resin is injected onto the adhesive surface of the in-mold foil to form a molded article in the cavity while joining the in-mold foil to the surface of the molded article. Hereinafter, a layer having a printed design such as a color and a pattern will be called a pattern layer, and in-mold foil will be called foil.

In a typical in-mold system, a mold is opened to peel off foil joined to the surface of a molded article while leaving a pattern layer remaining on the surface of the molded article. For example, see Japanese Patent Laid-Open No. 1-241416. FIG. 24 shows a typical in-mold system for forming a case molded article. The case molded article is a box having a specific opened face.

As shown in FIG. 24, the typical in-mold system for forming the case molded article includes a movable-side die plate 241, a fixed-side die plate 242, a foil feeder 243, and a foil winder 245. The foil feeder 243 and the foil winder 245 are both attached to the movable-side die plate 241. Long foil 244 for providing a pattern layer on the outer surface of the case molded article is drawn from the foil feeder 243. The foil 244 drawn from the foil feeder 243 is fed between the movable-side die plate 241 and the fixed-side die plate 242 and is hung over the foil winder 245. The foil feeder 243 and the foil winder 245 are rotated to feed the foil 244 from the foil feeder 243 to the foil winder 245.

When the movable-side die plate 241 and the fixed-side die plate 242 are closed, an in-mold decoration die including the movable-side die plate 241 and the fixed-side die plate 242 forms a cavity. The cavity is composed of the dented cavity-forming surface of the movable-side die plate 241 and the convex cavity-forming surface of the fixed-side die plate 242. The dented cavity-forming surface of the movable-side die plate 241 is formed on a mold movable-side nest 246 disposed on the movable-side die plate 241 while the convex cavity-forming surface of the fixed-side die plate 242 is formed on a mold fixed-side nest 247 disposed on the fixed-side die plate 242. The mold movable-side nest 246 is disposed with the dented cavity-forming surface opened to the fixed-side die plate 242 while the mold fixed-side nest 247 is disposed with the convex cavity-forming surface opposed to the dented cavity-forming surface of the mold movable-side nest 246.

The dented cavity-forming surface of the mold movable-side nest 246 is shaped depending on the outside shape of the case molded article (not shown) while the convex cavity-forming surface of the mold fixed-side nest 247 is shaped depending on the interior shape of the case molded article (not shown).

An in-mold decoration process using the typical in-mold system in FIG. 24 will be described below.

In the typical in-mold decoration process, the foil 244 is first drawn from the foil feeder 243 and is fed to the foil winder 245 while the movable-side die plate 241 and the fixed-side die plate 242 are opened. Thus, a design provided on the foil 244 is stopped at a predetermined position between the movable-side die plate 241 and the fixed-side die plate 242.

Subsequently, an ejecting mechanism (not shown) of a molder provided in the in-mold system moves a foil retaining plate 248 to a die-plate divided surface 249 of the movable-side die plate 241. Thus, the foil 244 is pressed and fixed to the die-plate divided surface 249.

The foil 244 is then stretched into the dented cavity-forming surface of the movable-side die plate 241 by, for example, vacuum suction so as to extend along the dented cavity-forming surface. The movable-side die plate 241 and the fixed-side die plate 242 are then closed to form the cavity having the dented cavity-forming surface of the movable-side die plate 241 and the convex cavity-forming surface of the fixed-side die plate 242. The cavity is a molding space shaped depending on the product shape of the manufactured case molded article.

Subsequently, the molder (not shown) injects molten resin (not shown) into the cavity so as to fill the cavity with the molten resin. When the molten resin flows into the cavity, the heat of the molten resin melts the adhesive layer of the foil 244 in the cavity, bonding the foil 244 to the molten resin.

After the completion of injection of the molten resin, the resin in the cavity is cooled by a cooling process. This solidifies the resin so as to form the case molded article (not shown). At this point, the foil 244 in the cavity is joined to the outer surface of the case molded article. The cooled resin shrinks so as to fit onto the convex cavity-forming surface of the fixed-side die plate 242. Thus, the case molded article is bonded to the convex cavity-forming surface of the fixed-side die plate 242.

Subsequently, the movable-side die plate 241 and the fixed-side die plate 242 are opened while the foil retaining plate 248 fixes the foil 244 on the die-plate divided surface 249 on the movable side. At this point, the case molded article is bonded on the convex cavity-forming surface of the fixed-side die plate 242, and thus the foil 244 joined to the case molded article is released from the movable-side die plate 241 along with the case molded article. The foil 244 includes a base film and a pattern layer stacked on a release layer disposed on the base film. With this configuration, only the pattern layer on the outer surface of the case molded article is peeled off from the release layer so as to remain on the outer surface of the case molded article. Thus, when the in-mold decoration die is opened, the pattern layer bonded to the outer surface of the case molded article is quickly peeled off from the release layer. The pattern layer not bonded to the case molded article remains on the foil 244.

In the case of subsequent molding, the foil feeder 243 and the foil winder 245 are rotated to feed a subsequent design on the foil 244 to the predetermined position between the movable-side die plate 241 and the fixed-side die plate 242. Thus, the in-mold system is prepared for the subsequent molding.

SUMMARY

In the conventional in-mold system, however, the in-mold decoration die is opened to quickly peel the pattern layer from the foil. Thus, the foil is likely to break when the in-mold decoration die is opened. This is because the foil is not resistant to a force that stretches the foil in a mold opening direction. The foil is stretched along the surface shape of the molded article while decreasing in thickness, leading to insufficient resistance to the force applied in the mold opening direction. In other words, when the in-mold decoration die is opened, the foil becomes less tensile strength. Hence, the foil is likely to break particularly at a point where the foil is most stretched within the surface of the molded article.

For example, the case molded article has a bottom wall and a rising wall that rises from the outer edge of the bottom wall and surrounds the bottom wall. The corners of the case molded article are located on the outside shape or the edge of the case molded article in plan view. The corners are curved portions with rapidly changing angles on the outside shape of the case molded article. In the case where the case molded article is fabricated by in-mold decoration, the foil is most stretched on the corners of the rising wall of the case molded article, causing the foil to stretch greater on the corners than at other points. In other words, the foil has the lowest tensile strength on the corners of the rising wall of the case molded article. Thus, in the case where the pattern layer is quickly peeled off from the foil by opening the in-mold decoration die, the foil is likely to break on the corners of the rising wall of the case molded article.

As has been discussed, the pattern layer is peeled off simultaneously from the foil on the corners of the rising wall of the case molded article and at points other than the corners. The foil has the lowest tensile strength on the corners. In this case, the foil is likely to break on the corners of the rising wall of the case molded article. A break on the foil may release substances constituting a printed color or pattern on the foil. The substances released from the foil may adhere to the mold fixed-side nest or the mold movable-side nest and lead to failures caused by foreign matters, resulting in lower yields.

In the case where an upper end is curved on the outer surface of the case molded article, that is, the upper end is curved on the outer surface of the rising wall of the case molded article and the pattern layer needs to be bonded to the curved upper end, a pattern on the curved upper end may be scratched, leading to deterioration of a design on the molded article. This problem will be discussed below with reference to FIGS. 25 to 28.

FIGS. 25 to 28 are partial enlarged sectional views illustrating the steps of operating a typical in-mold system. Specifically, FIGS. 25 to 28 show the operations of the in-mold system when an in-mold decoration die is opened. The in-mold system joins foil 254 to the outer surface of a case molded article 253 while forming the case molded article 253. An upper end 252 is curved on the outer surface of the case molded article 253, that is, the upper end 252 is curved on the outer surface of a rising wall 251 on the case molded article 253. The outer surface of the case molded article 253 joined to the foil 254 includes the curved upper end 252.

As shown in FIG. 25, in the case where the upper end 252 is curved on the outer surface of the rising wall 251 on the case molded article 253, a movable-side die plate 256 having a slide core 255 is used. Hereinafter, the upper end of the outer surface of the rising wall may be called a curved surface.

The slide core 255 has a cavity-forming surface 257 for forming a predetermined curved surface on the upper end of the outer surface of the rising wall 251 on the case molded article 253. Thus, the cavity-forming surface 257 of the slide core 255 is curved. The outer surface of the case molded article 253 is formed by the dented cavity-forming surface of a mold movable-side nest 258 disposed on the movable-side die plate 256 and the curved cavity-forming surface 257 of the slide core 255.

As shown in FIG. 25, a cavity is formed by the convex cavity-forming surface of a mold fixed-side nest 260 disposed on a fixed-side die plate 259, the dented cavity-forming surface of the mold movable-side nest 258 disposed on the movable-side die plate 256, and the curved cavity-forming surface 257 of the slide core 255. Molten resin injected into the cavity is cooled by a cooling process to form the case molded article 253. At this point, the foil 254 in the cavity is joined to the outer surface of the case molded article 253. After the cooling process, as shown in FIG. 26, the slide core 255 retracts from the case molded article 253.

Subsequently, as shown in FIGS. 27 and 28, the movable-side die plate 256 and the fixed-side die plate 259 are opened to quickly peel a pattern layer 254*a* from a base layer 254*b* of the foil 254 on the outer surface of the case molded article 253. The base layer 254*b* includes a base film and a release layer (not shown).

As shown in FIGS. 25 and 26, in the in-mold system, the foil 254 is undercut in the mold opening direction so as to surround the outer surface of the case molded article 253. This allows the foil 254 to overlap the curved surface 252 on the outer surface of the case molded article 253. Thus, as shown in FIGS. 27 and 28, when the pattern layer 254*a* bonded to the case molded article 253 is peeled off from the foil 254 by opening the in-mold decoration die, the rising wall 251 of the case molded article 253 presses the foil 254 overlapping the curved surface 252 upward and penetrates the foil 254. At this point, the pattern layer 254*a* rubs against the foil 254 on the curved surface 252 of the case molded article 253 and thus may cause scratches on the surface of the pattern layer 254*a* peeled from the foil 254.

An object of an aspect of the present invention is to provide an in-mold decorating method and an in-mold system which can prevent foil from breaking on the corners of the rising wall of a case molded article, the foil being most stretched on the corners.

An object of another aspect of the present invention is to provide an in-mold decorating method and an in-mold system which can collect a case molded article from an in-mold decoration die without damaging a design on the upper end of the rising wall of the case molded article even if the upper end is undercut in the opening direction of an in-mold decoration die.

An aspect of an in-mold decorating method according to the present invention includes: a first step of joining foil to the surface of a case molded article while molding the case molded article by injecting resin into a molding space formed in an in-mold decoration die; a second step of peeling the foil from the surface of the case molded article while leaving a pattern layer at least on the upper ends of the corners of the rising wall on the case molded article; and a third step of peeling the foil from the surface of the case molded article while leaving the pattern layer at points other than points where the foil is peeled off in the second step.

Another aspect of the in-mold decorating method according to the present invention, wherein in the third step, the foil is first peeled off from the surface of the case molded article while leaving the pattern layer at least on the upper end of the rising wall other than the corners, and the foil is peeled off from the surface of the case molded article while leaving the pattern layer at other points where the foil is joined to the surface of the case molded article.

Another aspect of the in-mold decorating method according to the present invention, wherein in the second step, a first push pin presses the foil to the divided surface of a first slide core while the first slide core assembled to the in-mold decoration die retracts, the first slide core forming the surface of the corner into a predetermined shape.

Another aspect of the in-mold decorating method according to the present invention, wherein in the third step, a second push pin presses the foil to the divided surface of a second slide core while the second slide core assembled to the in-mold decoration die retracts, the second slide core forming the surface of the rising wall other than the corners into a predetermined shape.

Another aspect of the in-mold decorating method according to the present invention, wherein in the third step, a second slide core assembled to the in-mold decoration die retracts, the second slide core forming the surface of the rising wall other than the corners into a predetermined shape, and then a tilting pin is diagonally protruded from the divided surface of the in-mold decoration die facing the divided surface of the second slide core so as to press the foil.

Another aspect of the in-mold decorating method according to the present invention, wherein in the third step, after a second slide core assembled to the in-mold decoration die retracts, the second slide core forming the surface of the rising wall other than the corners into a predetermined shape or when the in-mold decoration die starts opening, a stick is protruded from the die-plate divided surface of the in-mold decoration die so as to press the foil.

Another aspect of the in-mold decorating method according to the present invention, wherein the rising wall of the case molded article has a rounded upper end surface.

Another aspect of the in-mold decorating method according to the present invention, wherein the rising wall of the case molded article has an upper end surface which is undercut in the mold opening direction of the in-mold decoration die.

An aspect of an in-mold system according to the present invention is an in-mold system in which foil including a pattern layer is joined to the surface of a case molded article while the molded article is molded by injecting resin into a molding space, the in-mold system including:

an in-mold decoration die including a first die plate and a second die plate that are capable of opening, the in-mold decoration die forming the molding space corresponding to the shape of the case molded article when the first die plate and the second die plate are closed;

a first slide core that is assembled to the in-mold decoration die so as to form the surface of a corner of the rising wall on the case molded article into a predetermined shape, the first slide core retracting from the case molded article before the first die plate and the second die plate start opening;

a divided surface provided on the first slide core; and a first push pin that peels the foil from the surface of the case molded article while leaving the pattern layer at least on the upper end of the corner of the rising wall on the case molded article, by pressing the foil to the divided surface of the first slide core when the first slide core retracts.

Another aspect of the in-mold system according to the present invention further includes:

a second slide core that is assembled to the in-mold decoration die so as to form the surface of the rising wall other than the corner into a predetermined shape, the second slide core retracting from the case molded article before the first die plate and the second die plate start opening after the first slide core retracts;

a divided surface provided on the second slide core; and a second push pin that peels the foil from the surface of the case molded article while leaving the pattern layer at least on the upper end of the rising wall other than the corner, by pressing the foil to the divided surface of the second slide core while the second slide core retracts.

Another aspect of the in-mold system according to the present invention further includes:

a second slide core that is assembled to the in-mold decoration die and retracts from the case molded article before the first die plate and the second die plate start opening after the first slide core retracts, the second slide core forming the surface of the rising wall other than the corner into a predetermined shape;

a divided surface provided on the second slide core;

a tilting pin that is diagonally protruded, after the second slide core retracts, so as to press the foil in the protruding direction and peel the foil from the surface of the case molded article while leaving the pattern layer at least on the upper end of the rising wall other than the corner.

Another aspect of the in-mold system according to the present invention further includes:

a second slide core that is assembled to the in-mold decoration die and retracts from the case molded article before the first die plate and the second die plate start opening after the first slide core retracts, the second slide core forming the surface of the rising wall other than the corner into a predetermined shape; and a stick that is protruded, after the second slide core retracts or when the in-mold decoration die starts opening, so as to press the foil in the protruding direction, and peel the foil from the surface of the case molded article while leaving the pattern layer at least on the upper end of the rising wall other than the corner.

Another aspect of the in-mold system according to the present invention, wherein the rising wall of the case molded article has a rounded upper end surface.

Another aspect of the in-mold system according to the present invention, wherein the rising wall of the case molded article has an upper end surface which is undercut in the mold opening direction of the in-mold decoration die.

According to an aspect of the present invention, the occurrence of breaks reduces on the foil on the corners of the rising wall of the case molded article, the foil being most stretched on the corners. According to another aspect of the present invention, also in the case where the upper end of the rising wall of the case molded article is undercut in the mold opening direction of the in-mold decoration die, scratches reduce on a design applied to the undercut upper end.

DETAILED DESCRIPTION

Figure 1:
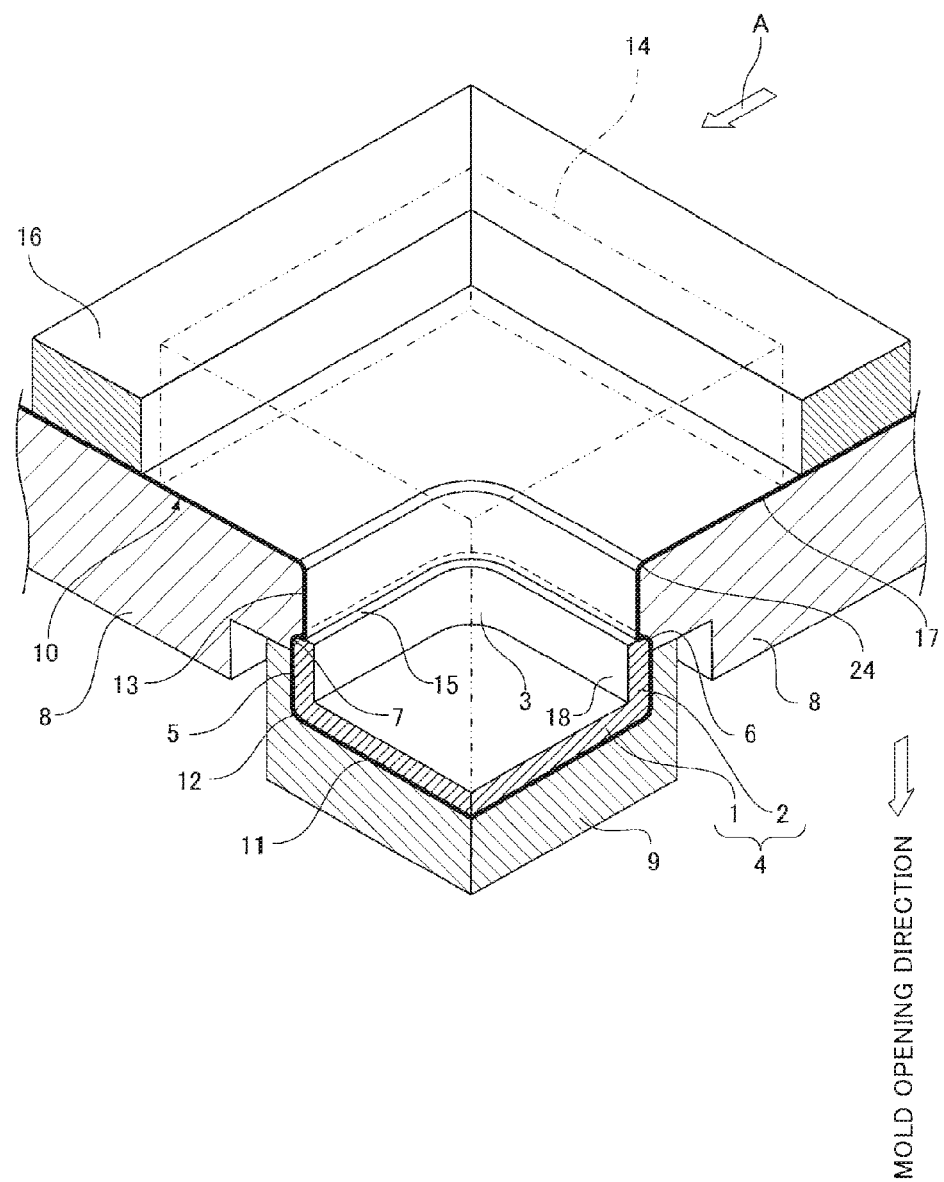
FIG. 1 is a partial enlarged perspective sectional view illustrating an in-mold decoration die provided in an in-mold system according to a first embodiment.

Embodiments of the present invention will be described below with reference to the accompanying drawings. The same constituent elements are indicated by the same reference numerals and the explanation thereof is omitted. The constituent elements are schematically illustrated in the drawings to enhance understanding. The illustrated constituent elements are different in shape, thickness, and length from actual constituent elements for the creation of the drawings. The shapes, dimensions, numbers, and numerical values of the constituent elements in the following embodiments are merely exemplary and are not particularly limited. The embodiments may be changed in various ways without substantially departing from the effect of the present invention.

First Embodiment

FIG. 1 is a partial enlarged perspective sectional view illustrating an in-mold decoration die provided in an in-mold system according to a first embodiment. In the in-mold decoration die, foil 10 is joined to the outer surface of a case molded article 4 while the case molded article 4 is formed.

The case molded article 4 has a bottom wall 1 and a rising wall 2 that rises from the outer edge of the bottom wall 1 and surrounds the bottom wall 1. The case molded article 4 has corners 3 on the outside shape or edge of the case molded article 4 in plan view. In this configuration, the corners 3 are curved portions forming rapidly changing angles on the outside shape of the case molded article 4.

As shown in FIG. 1, an upper end 6 is curved on an outer surface 5 of the case molded article 4 formed by the in-mold decoration die, that is, the upper end 6 is curved on the outer surface 5 of the rising wall 2 of the case molded article 4. The curved upper end 6 forms a continuous edge line. Hereinafter, the upper end of the outer surface of the case molded article 4 may be called a curved part.

In the case where the upper end 6 is curved on the outer surface 5 of the rising wall 2 of the case molded article 4, a movable-side die plate (not shown) having a slide core 8 is used. This is because the curved part 6 on the outer surface 5 of the case molded article 4 is undercut in a mold opening direction shown in FIG. 1. The slide core 8 has a cavity-forming surface 7 for forming a predetermined curved surface on the upper end 6 of the outer surface 5 of the case molded article 4. Thus, the cavity-forming surface 7 of the slide core 8 is curved.

The outside shape of the case molded article 4 is formed by the dented cavity-forming surface of the movable-side die plate (not shown) that is an example of a first die plate. The dented cavity-forming surface of the movable-side die plate includes a dented cavity-forming surface formed on a mold movable-side nest 9 assembled to the movable-side die plate and the curved cavity-forming surface 7 formed on the slide core 8 assembled to the movable-side die plate.

The foil 10 includes a pattern layer (not shown) having a printed design such as a color and a pattern. The pattern layer is stacked on a release layer disposed on the base film (not shown) of the foil 10. The design on the foil 10 is transferred to the bottom 11 of the case molded article 4, the outer surface 5 of the case molded article 4, and a curved surface 12 that is rounded on the case molded article 4 so as to connect the bottom 11 and the outer surface 5. The design is also transferred to the curved part 6 on the outer surface 5 of the case molded article 4. Thus, in order to transfer the design from the bottom 11 to the rounded end of the curved part 6 of the outer surface 5, the slide core 8 has a divided surface 13 that rises from the rounded end of the curved cavity-forming surface 7 in the mold opening direction in FIG. 1. The rounded end on the cavity-forming surface 7 of the slide core 8 corresponds to the rounded end on the curved part 6 of the outer surface 5 of the case molded article 4.

The shape of the inner surface of the case molded article 4 and the shape of an upper end face 15 on the rising wall 2 of the case molded article 4 are formed by the convex cavity-forming surface of a fixed-side die plate (not shown) that is an example of a second die plate. The convex cavity-forming surface of the fixed-side die plate is formed on a mold fixed-side nest 14 assembled to the fixed-side die plate. The fixed-side die plate has a divided surface for the divided surface 13 of the slide core 8. The divided surface may be formed on the mold fixed-side nest 14 assembled to the fixed-side die plate.

The mold movable-side nest 9 is disposed such that the dented cavity-forming surface is opened to the fixed-side die plate; meanwhile, the mold fixed-side nest 14 is disposed such that the convex cavity-forming surface is opposed to the dented cavity-forming surface of the mold movable-side nest 9.

The in-mold decoration die configured thus is closed, forming a cavity by the dented cavity-forming surface of the mold movable-side nest 9, the convex cavity-forming surface of the mold fixed-side nest 14, and the curved cavity-forming surface 7 of the slide core 8. The cavity is a molding space that is shaped according to the product shape of the fabricated case molded article 4.

When the in-mold decoration die is opened, the foil 10 is fed along an arrow A in FIG. 1. This allows a predetermined design on the foil 10 to stop at a predetermined position between the movable-side die plate and the fixed-side die plate. Subsequently, the foil 10 is pressed to a die-plate divided surface 17 of the movable-side die plate by a foil retaining plate 16. This fixes the foil 10 on the die-plate divided surface 17. After that, the foil 10 is sucked and stretched into the dented cavity-forming surface of the movable-side die plate by, for example, vacuum suction. Thus, the foil 10 partially extends along the dented cavity-forming surface for forming the outside shape of the case molded article 4.

After that, the in-mold decoration die is closed to form the cavity according to the product shape of the case molded article 4. Molten resin is then injected into the cavity. After the cavity is filled with the molten resin, the resin in the cavity is cooled by a cooling process. This solidifies the resin so as to form the case molded article 4. FIG. 1 shows the case molded article 4 formed after the cooling process.

The rising wall 2 of the case molded article 4 includes a plurality of linear parts 18 and the corners 3. The corners 3 are curved portions interposed between the adjacent linear parts 18. The corners 3 of the case molded article 4 each have a radius of curvature in plan view. Thus, the corners 3 have rounded shapes on the rising wall 2 in plan view.

As has been discussed, the foil 10 is stretched along the outside shape of the case molded article 4. In the case where the rising wall 2 of the case molded article 4 has the corners 3, the foil 10 is most stretched on the corners 3. The foil 10 is stretched greater on the corners 3 than at points other than the corners 3. Thus, the foil 10 has the lowest tensile strength on the corners 3 of the rising wall 2 of the case molded article 4. Thus, in the case where the pattern layer (not shown) is simultaneously peeled off from the foil 10 on the corners 3 and at the points other than the corners 3, the foil 10 is likely to break on the corners 3.

Figure 27:
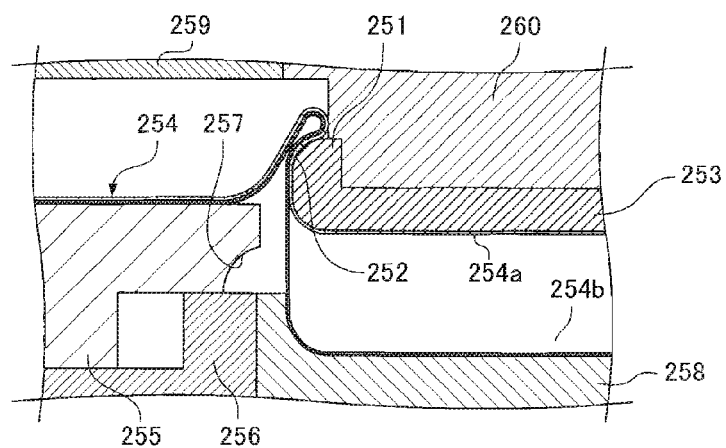
FIG. 27 is a process partial enlarged sectional view showing an operation of the typical in-mold system.
Figure 28:
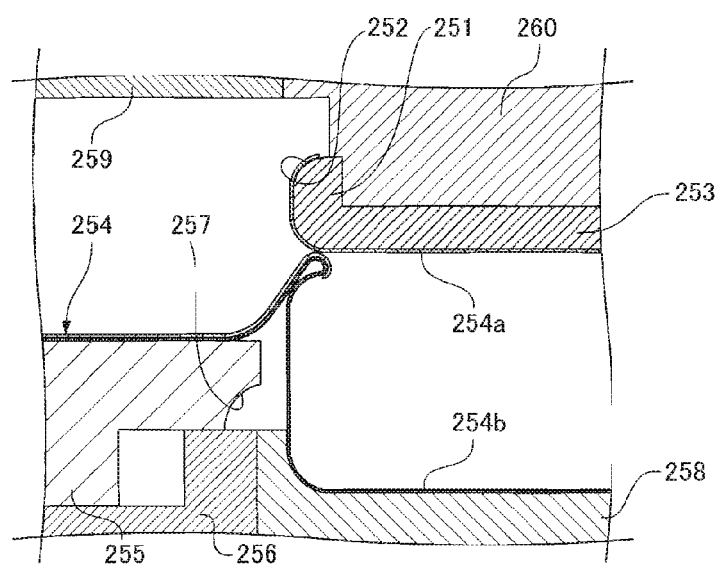
FIG. 28 is a process partial enlarged sectional view showing an operation of the typical in-mold system.

As has been discussed, the curved part 6 on the outer surface 5 of the case molded article 4 is undercut in the mold opening direction in FIG. 1. In this case, the foil 10 is undercut in the mold opening direction so as to surround the outer surface 5 of the case molded article 4. The foil 10 overlaps the curved part 6 on the outer surface 5 of the case molded article 4. Hence, as illustrated in FIGS. 25 to 28, in the case where the pattern layer is quickly peeled from the release layer over the outer surface of the case molded article by opening the in-mold decoration die, the pattern layer rubs against the foil on the curved outer surface of the case molded article even if the slide core retracts before the in-mold decoration die is opened. This may cause scratches on the surface of the pattern layer peeled from the foil. As illustrated in FIGS. 27 and 28, this is because when the pattern layer 254a is peeled from the foil 254, the rising wall 251 of the case molded article 253 presses the foil 254 overlapping the curved surface 252 upward and then penetrates the foil 254.

Figure 2:
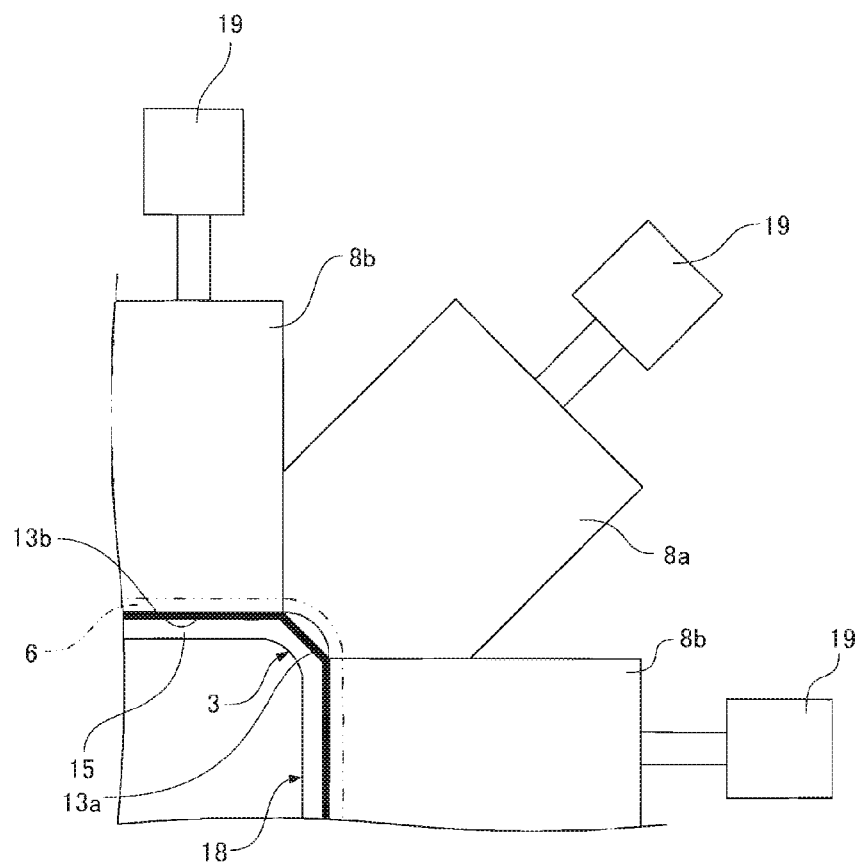
FIG. 2 is a partial enlarged plan view illustrating a slide core assembled to the in-mold decoration die according to the first embodiment.

In the first embodiment, as shown in FIG. 2, each of the corners 3 on the rising wall 2 has a slide core 8a while each of the linear parts 18 on the rising wall 2 has a slide core 8b. The slide cores 8a and 8b may be driven by pneumatic or hydraulic cylinders 19. The use of the cylinders 19 for the slide cores can separately control the operations of the slide cores.

Preferably, a divided surface 13a formed on the slide core 8a for forming the curved part 6 on the corner 3 is not a curved surface but a flat surface. In the case where the divided surface 13a of the slide core 8a is a flat surface, the divided surface 13a is formed such that both ends of the divided surface 13a of the slide core 8a overlap both ends of rounded inner edge of the curved part 6 on the corner 3 in plan view. The inner edge of the curved part 6 is rounded on the corner 3 in plan view, which indicates that the cavity-side edge of the curved part 6 is rounded on the corner 3 in plan view.

Figure 3:
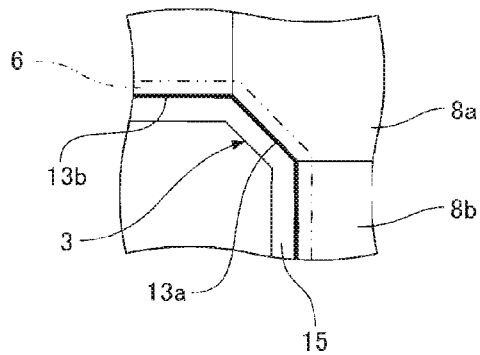
FIG. 3 is a partial enlarged plan view illustrating another example of the case molded article according to the first embodiment.

In the case where the divided surface 13a of the slide core 8a is a flat surface, the rounded shape of the inner edge of the curved part 6 in plan view expands from the divided surface 13a of the slide core 8a. As the rounded shape grows, a design on the corner 3 considerably spreads to the upper end face 15 of the rising wall 2. In the case where a design on the corner 3 considerably spreads to the upper end face 15 of the rising wall 2, as shown in FIG. 3, the cavity-forming surface of the slide core 8a is preferably formed such that the curved part 6 has a linear inner edge on the corner 3 in plan view. Thus, on the corner 3 in plan view, the divided surface 13a of the slide core 8a is aligned with the inner edge of the curved part 6 on the corner 3. This prevents a design from spreading to the upper end face 15 of the rising wall 2, improving the appearance of the case molded article 4.

In the case where the curved part 6 on the corner 3 is formed so as to have a linear inner edge in plan view, the curved part 6 of the corner 3 may be formed such that only the inner edge of the curved part 6 is linear. Alternatively, as shown in FIG. 3, the corner 3 may be formed such that the inner and outer edges of the curved part 6 are linear and the inner edge of the corner 3 is linear in plan view, or the corner 3 may be formed such that the inner and outer edges of the curved part 6 are linear and the inner edge of the corner 3 is rounded in plan view. Alternatively, the corner 3 may be formed such that the inner edges of the curved part 6 and the corner 3 are linear and the outer edge of the curved part 6 is rounded in plan view.

Figure 4:
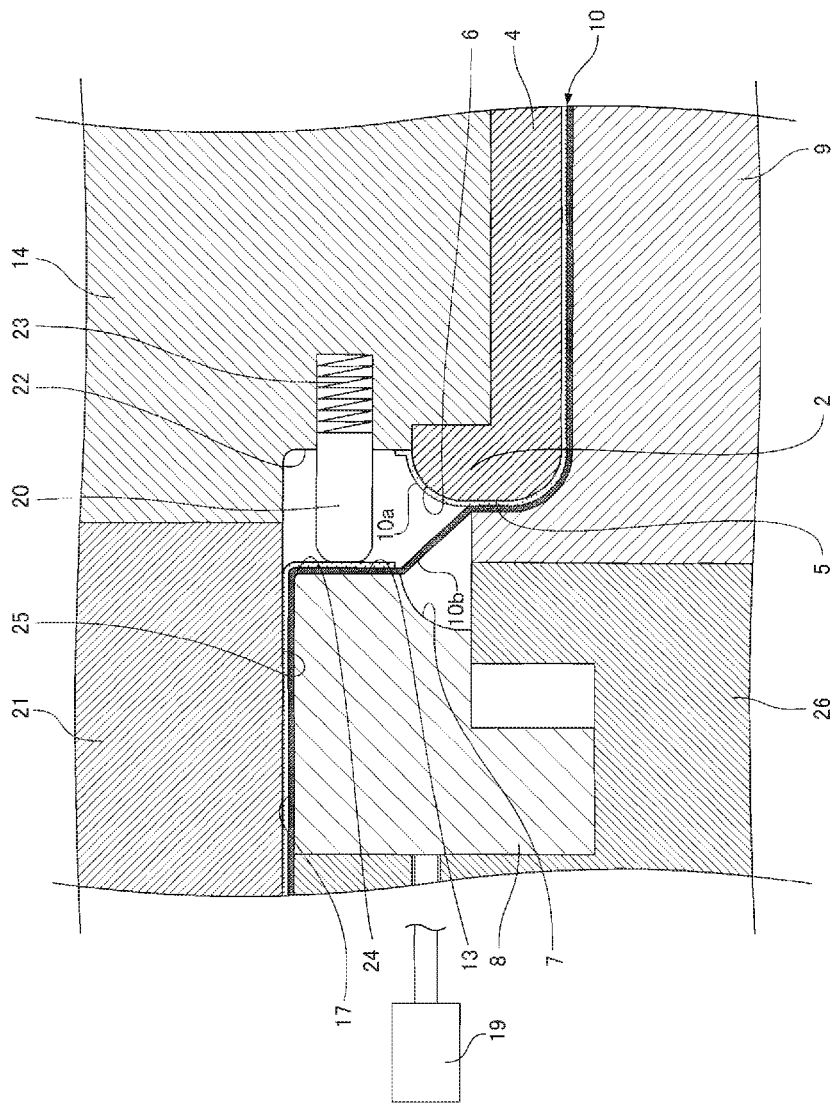
FIG. 4 is a partial enlarged sectional view illustrating the in-mold decoration die immediately before the in-mold decoration die is opened according to the first embodiment.

In the first embodiment, as shown in FIG. 4, a push pin 20 for pressing the foil 10 to the divided surface 13 of the slide core 8 is provided on a fixed-side die plate 21 that is an example of the second die plate. FIG. 4 is a partial enlarged sectional view illustrating the in-mold decoration die according to the first embodiment. Specifically, FIG. 4 illustrates the in-mold decoration die immediately after the slide core 8 retracts from the case molded article 4.

As shown in FIG. 4, the push pin 20 is pushed from a hole on the fixed-side die plate 21 in a direction orthogonal to a divided surface 22 of the fixed-side die plate 21 facing the divided surface 13 of the slide core 8. In the first embodiment, the push pin 20 is provided in the mold fixed-side nest 14 disposed on the fixed-side die plate 21. In other words, the push pin 20 is protruded from the hole on the mold fixed-side nest 14 to the divided surface 13 of the slide core 8. Thus, the divided surface 22 of the fixed-side die plate 21 is formed on the mold fixed-side nest 14. The push pin 20 may be operated by the urging force of a spring 23 attached into the hole that contains the push pin 20.

As shown in FIG. 4, a part of the die-plate divided surface 17 of a movable-side die plate 26 includes the surface of the slide core 8 opposed to the fixed-side die plate 21. The divided surface 13 of the slide core 8 is orthogonal to the die-plate divided surface 17. Thus, the foil 10 is bent at a right angle on a corner 24 of the slide core 8, the divided surface 13 connecting to the die-plate divided surface 17 on the corner 24. In the first embodiment, the corner 24 of the slide core 8 has a rounded edge. Hence, the foil 10 stretched into the dented cavity-forming surface of the movable-side die plate 26 by, for example, vacuum suction satisfactorily slides on the edge of the corner 24, and thus smoothly extends along the dented cavity-forming surface for forming the outside shape of the case molded article 4. In the case where the corner 24 of the slide core 8 has a sharp edge, the foil 10 poorly slides over the edge of the corner 24 of the slide core 8 and thus does not smoothly extend along the dented cavity-forming surface of the movable-side die plate 26.

In the first embodiment, a clearance larger than the thickness of the foil 10 by about 0.02 mm to 0.04 mm is formed between the die-plate divided surface 17 of the movable-side die plate 26 and a die-plate divided surface 25 of the fixed-side die plate 21 in the closed in-mold decoration die. Thus, even if the in-mold decoration die is closed, the slide core 8 can smoothly operate.

The operations of the in-mold decoration die configured thus will be described below.

When the in-mold decoration die is closed, the foil 10 is interposed between the divided surface 13 of the slide core 8 provided in the opening direction of the in-mold decoration die from the rounded end of the curved part 6 on the outer surface 5 of the case molded article 4 and the divided surface 22 of the fixed-side die plate 21 facing the divided surface 13 of the slide core 8. At this point, the push pin 20 is stored in the hole provided on the fixed-side die plate 21.

After the in-mold decoration die is closed, the slide core 8 retracts to cause the urging force of the spring 23 to protrude the push pin 20 from the hole in synchronization of the retraction of the slide core 8 out of the divided surface 22 of the fixed-side die plate 21. At this point, the foil 10 is interposed between the divided surface 13 of the slide core 8 and the push pin 20. Thus, as shown in FIG. 4, a pattern layer 10a of the foil 10 on the outer surface 5 of the case molded article 4 is peeled off from a base layer 10b of the foil 10 from the rounded end of the curved part 6 on the outer surface 5 of the case molded article 4 in synchronization of the retraction of the slide core 8. As has been discussed, the curved part 6 is formed on the upper end of the rising wall 2 by the slide core 8. Furthermore, the spring 23 is provided in the hole accommodating the push pin 20.

The amount of exfoliation of the pattern layer 10a from the foil 10 varies with the amount of retraction of the slide core 8. In the in-mold decoration die, the pattern layer 10a is preferably peeled off from the foil 10 at least on the upper end 6 on the outer surface of the rising wall 2 by the retraction of the slide core 8.

An in-mold decorating method according to the first embodiment will be described below. FIGS. 5 to 16 are process sectional views showing an in-mold decorating process according to the first embodiment. The in-mold decorating process according to the first embodiment will be described in 12 steps.

Figure 5:
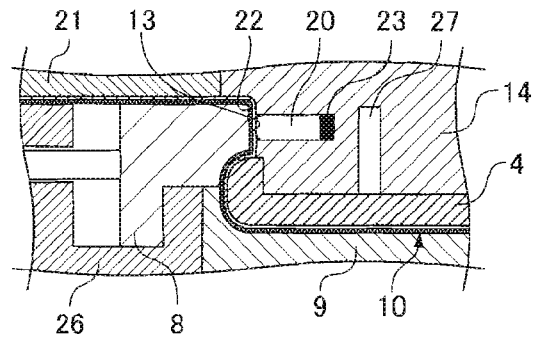
FIG. 5 is a partial enlarged sectional view showing a molding process according to the first embodiment.

As shown in FIG. 5, when the in-mold decoration die is closed, the foil 10 is interposed between the divided surface 22 of the mold fixed-side nest 14 assembled to the fixed-side die plate 21 and the divided surface 13 of the slide core 8. At this point, the push pin 20 is accommodated in the hole formed on the mold fixed-side nest 14 assembled to the fixed-side die plate 21.

Figure 6:
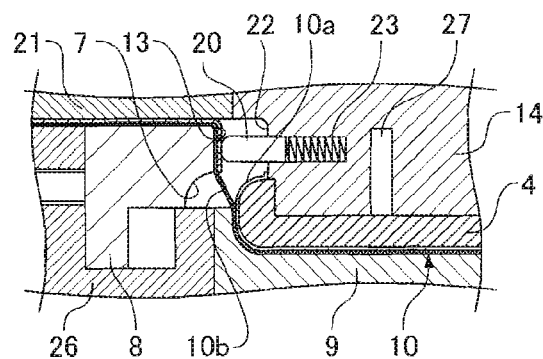
FIG. 6 is a partial enlarged sectional view showing the molding process according to the first embodiment.

Subsequently, as shown in FIG. 6, the slide core 8 is retracted to cause the urging force of the spring 23 assembled into the mold movable-side nest 14 to protrude the push pin 20 from the hole formed on the mold movable-side nest 14 in synchronization with the retraction of the slide core 8. At this point, the foil 10 is interposed between the divided surface 13 of the slide core 8 and the push pin 20, peeling the pattern layer 10a from the foil 10 from the rounded end of the curved part 6 on the outer surface 5 of the case molded article 4 in synchronization with the retraction of the slide core 8.

Figure 7:
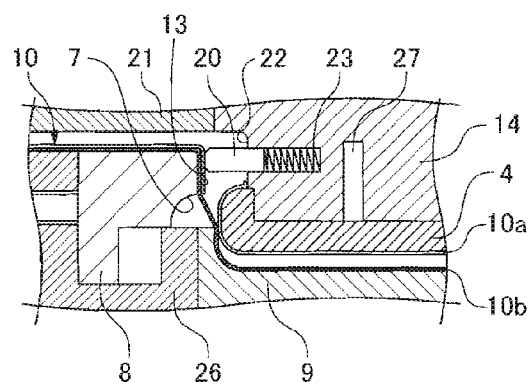
FIG. 7 is a partial enlarged sectional view showing the molding process according to the first embodiment.
Figure 8:
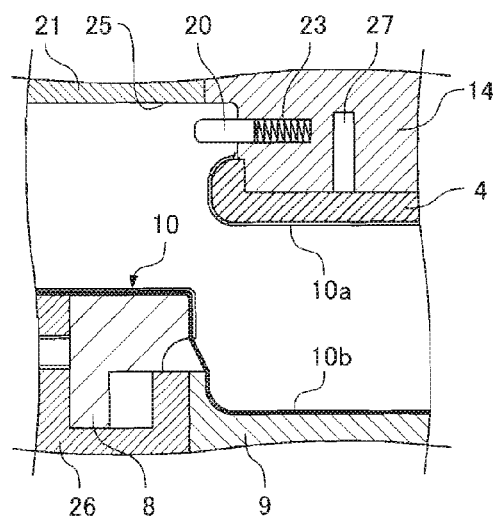
FIG. 8 is a partial enlarged sectional view showing the molding process according to the first embodiment.
Figure 9:
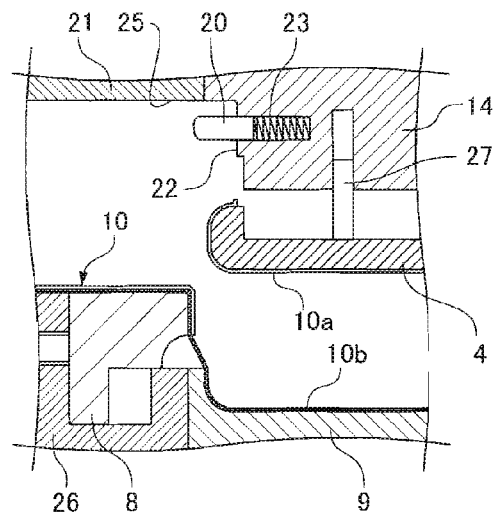
FIG. 9 is a partial enlarged sectional view showing the molding process according to the first embodiment.

After the completion of retraction of the slide core 8, as shown in FIG. 7, the movable-side die plate 26 and the fixed-side die plate 21 start opening. As shown in FIGS. 8 and 9, the movable-side die plate 26 and the fixed-side die plate 21 are opened to protrude an ejector pin 27 from the fixed-side die plate 21. This removes the case molded article 4 from the convex cavity-forming surface of the fixed-side die plate 21 as shown in FIG. 9. In the first embodiment, as has been discussed, the convex cavity-forming surface is formed on the mold fixed-side nest 14 disposed on the fixed-side die plate 21. The ejector pin 27 is protruded from the fixed-side die plate 21 by, for example, a spring included in a projecting mechanism (not shown) when the movable-side die plate 26 and the fixed-side die plate 21 are opened. In the first embodiment, the ejector pin 27 is assembled into the mold fixed-side nest 14 and thus is protruded from the mold fixed-side nest 14.

Figure 10:
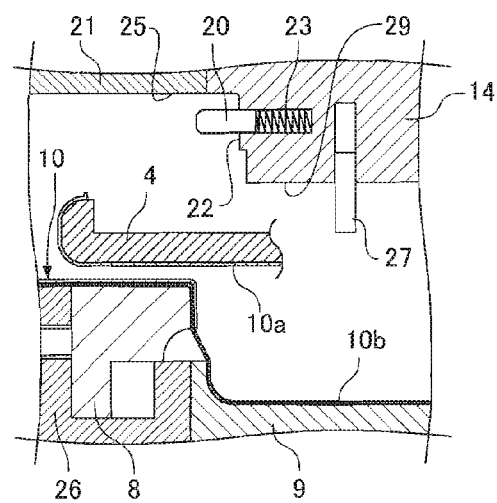
FIG. 10 is a partial enlarged sectional view showing the molding process according to the first embodiment.
Figure 11:
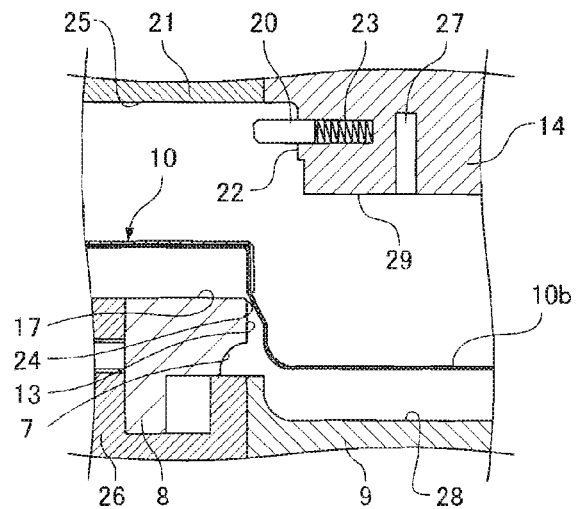
FIG. 11 is a partial enlarged sectional view showing the molding process according to the first embodiment.

As shown in FIG. 10, the case molded article 4 removed from the convex cavity-forming surface of the mold fixed-side nest 14 is collected from the in-mold decoration die. After that, as shown in FIG. 11, the foil 10 is released from the foil retaining plate 16 (not shown). At this point, the ejector pin 27 is accommodated in the mold fixed-side nest 14 by an ejecting mechanism (not shown) in synchronization with the operation of the foil retaining plate 16.

Figure 12:
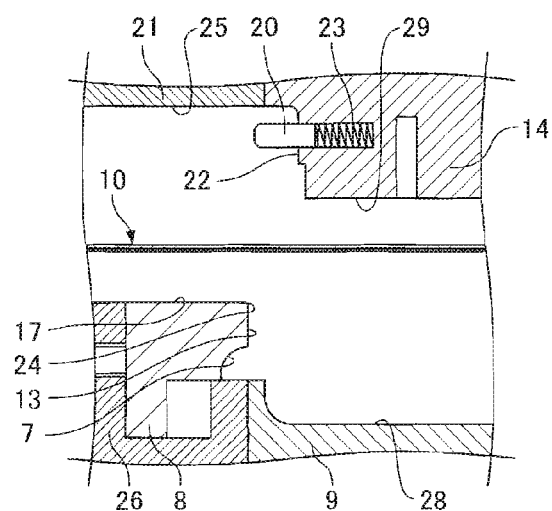
FIG. 12 is a partial enlarged sectional view showing the molding process according to the first embodiment.

As shown in FIG. 12, the long foil 10 is fed to locate a subsequent predetermined design on the foil 10 in a predetermined position between the movable-side die plate 26 and the fixed-side die plate 21. Thus, the in-mold decoration die is prepared for subsequent molding.

Figure 13:
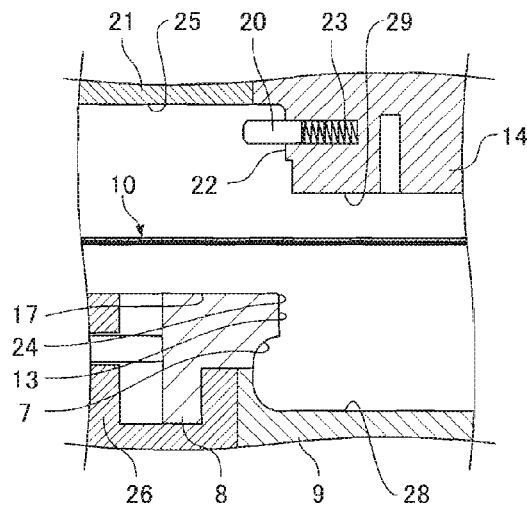
FIG. 13 is a partial enlarged sectional view showing the molding process according to the first embodiment.
Figure 14:
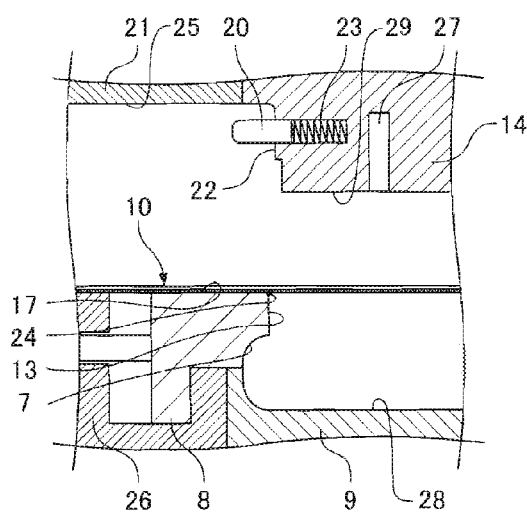
FIG. 14 is a partial enlarged sectional view showing the molding process according to the first embodiment.

Subsequently, as shown in FIG. 13, the slide core 8 moves forward to return to a predetermined position. After that, as shown in FIG. 14, the foil retaining plate 16 (not shown) moves to the movable-side die plate 26 to press the foil 10 to the die-plate divided surface 17 of the movable-side die plate 26. Thus, the foil 10 is fixed.

Figure 15:
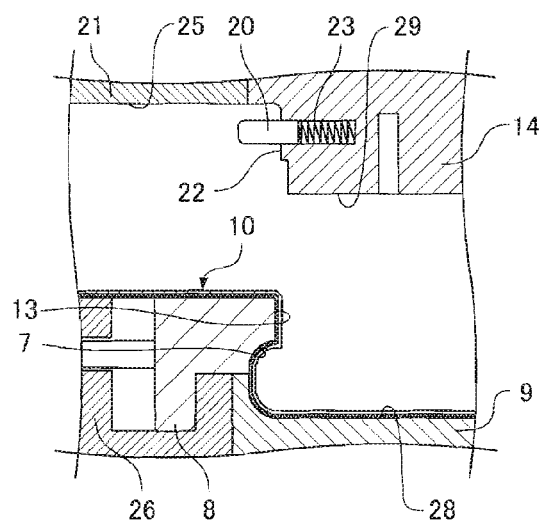
FIG. 15 is a partial enlarged sectional view showing the molding process according to the first embodiment.

As shown in FIG. 15, the foil 10 is then stretched by, for example, vacuum suction into the dented cavity-forming surface for forming the outside shape of the case molded article 4, extending a part of the long foil 10 along the dented cavity-forming surface.

Figure 16:
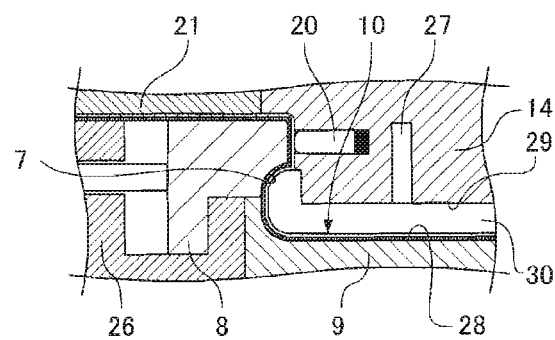
FIG. 16 is a partial enlarged sectional view showing the molding process according to the first embodiment.

Subsequently, as shown in FIG. 16, the movable-side die plate 26 and the fixed-side die plate 21 are closed. At this point, the push pin 20 protruding from the mold fixed-side nest 14 is returned to the original position by a cam mechanism or the like (not shown) in synchronization with the closing operation of the movable-side die plate 26 and the fixed-side die plate 21, and is accommodated into the mold fixed-side nest 14. The movable-side die plate 26 and the fixed-side die plate 21 are closed to form a cavity 30 surrounded by a dented cavity-forming surface 28 of the mold movable-side nest 9, the curved cavity-forming surface 7 of the slide core 8, and a convex cavity-forming surface 29 of the mold fixed-side nest 14. The cavity 30 is the molding space that is shaped according to the product shape of the fabricated case molded article.

Subsequently, molten resin (not shown) is injected into the cavity 30 so as to fill the cavity 30 with the molten resin. After the completion of injection of the molten resin, the resin filled in the cavity 30 is cooled in the cooling process. This solidifies the resin so as to form the case molded article 4. At this point, the foil 10 in the cavity 30 is joined to the outer surface of the case molded article 4.

The push pin 20 may be retracted by an inclined surface on the divided surface 13 of the slide core 8. In this case, when the in-mold decoration die is closed, the end of the push pin 20 slides on the inclined surface formed on the divided surface 13 of the slide core 8, causing the push pin 20 to retract into the mold fixed-side nest 14. Alternatively, the push pin 20 may be retracted by an actuator, e.g., a pneumatic or hydraulic cylinder. In this case, the actuator may protrude the push pin 20 in synchronization with the retraction of the slide core 8.

An example of the order of driving of the slide cores 8 will be described below, the slide cores 8 forming the upper end 6 on the outer surface of the rising wall 2 of the case molded article 4 into a curved shape.

Figure 17A:
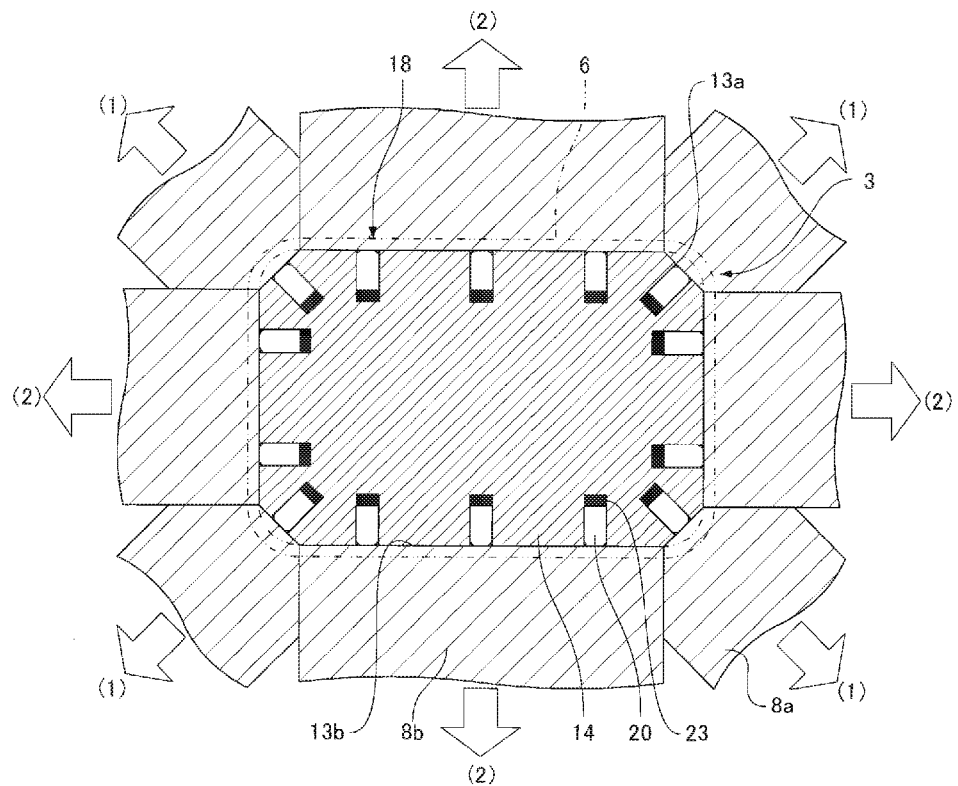
FIG. 17A is a sectional view for explaining the driving order of the slide cores according to the first embodiment.
Figure 17B:
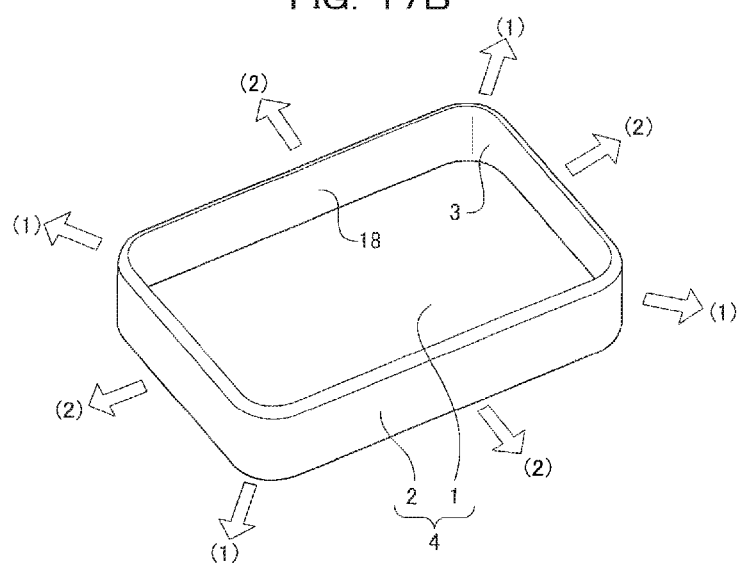
FIG. 17B is a perspective view for explaining the driving order of the slide cores according to the first embodiment.

FIGS. 17A and 17B are explanatory drawings showing the driving order of the slide cores according to the first embodiment. As shown in FIGS. 17A and 17B, in the first embodiment, the four slide cores 8a and the four slide cores 8b are assembled to the movable-side die plate 26 of the in-mold decoration die. The four slide cores 8a are provided for the respective four corners 3 of the rising wall 2 of the case molded article 4 while the four slide cores 8b are provided for the respective four linear parts 18 of the rising wall 2 of the case molded article 4. Each of the slide cores 8a has one of the push pins 20 while each of the slide cores 8b has at least two of the push pins 20. Specifically, the slide core 8b provided along a long side of the case molded article 4 has three of the push pins 20 while the slide core 8b provided along a short side of the case molded article 4 has two of the push pins 20.

In this layout of the slide cores 8a and 8b, in the step of retracting the slide cores 8 from the case molded article 4, the four slide cores 8a provided for forming the curved parts 6 on the four corners 3 are preferably retracted at the same time, the foil 10 being most stretched on the four corners 3. Thus, as illustrated in FIG. 4, the foil 10 is peeled off from the surface of the case molded article 4 while leaving the pattern layer 10a at least on the upper end 6 on the outer surface of the corner 3. Subsequently, the four slide cores 8b provided for forming the curved parts 6 on the four linear parts 18 are simultaneously retracted. Thus, as illustrated in FIG. 4, the foil 10 is peeled off from the surface of the case molded article 4 while leaving the pattern layer 10a at least on the upper end 6 on the outer surface of the linear part 18.

In this way, the slide cores 8a provided for the corners 3 first retract so as to peel off the pattern layer 10a from the foil 10 on the corners 3 where the foil is most likely to be broken. The pattern layer 10a starts peeling off from each of the rounded ends of the curved parts 6 on the outer surfaces of the corners 3. Thus, the foil is less likely to be broken than in the case where the in-mold decoration die is opened to simultaneously peel off the pattern layer from the foil over the outer surface of the case molded article. The pattern layer 10a is peeled off on each of the corners 3 by a resultant force of a force applied perpendicularly to the mold opening direction and a force applied in the mold opening direction. The pattern layer 10a is peeled off from the foil 10 at least on each of the upper ends 6 on the outer surfaces of the corners 3.

As shown in FIG. 4, when the slide core 8 retracts, the push pin 20 for pressing the foil 10 to the divided surface 13 of the slide core 8 peels off the pattern layer 10a from the foil 10 at least on the curved part 6 of the outer surface 5 of the case molded article 4. Hence, when the in-mold decoration die is opened, the foil 10 does not overlap the curved part 6 of the outer surface 5 of the case molded article 4, allowing the case molded article 4 to be collected from the in-mold decoration die without damaging a design transferred to the curved part 6.

As illustrated in FIG. 2, in the case where the divided surface 13a of the slide core 8a is a flat surface, the push pin 20 is protruded perpendicularly to the divided surface 13a of the slide core 8a. This allows the push pin 20 to satisfactorily press the foil 10 to the divided surface 13a of the slide core 8a, also in second and third embodiments.

The configuration and method in the first embodiment are also applicable to in-mold decoration for transferring the pattern layer to the upper end face 15 of the rising wall 2 of the case molded article 4. In the case where the pattern layer is transferred to the upper end face 15 of the rising wall 2 of the case molded article 4, the upper end 6 on the outer surface of the rising wall 2 of the case molded article 4 may have a flat surface or a curved surface. This holds true also in the following second and third embodiments.

The fixed-side die plate 21 and the movable-side die plate 26 may not have a nested structure, also in the following second and third embodiments.

Second Embodiment

Differences in a second embodiment from the first embodiment will be described below.

Figure 18:
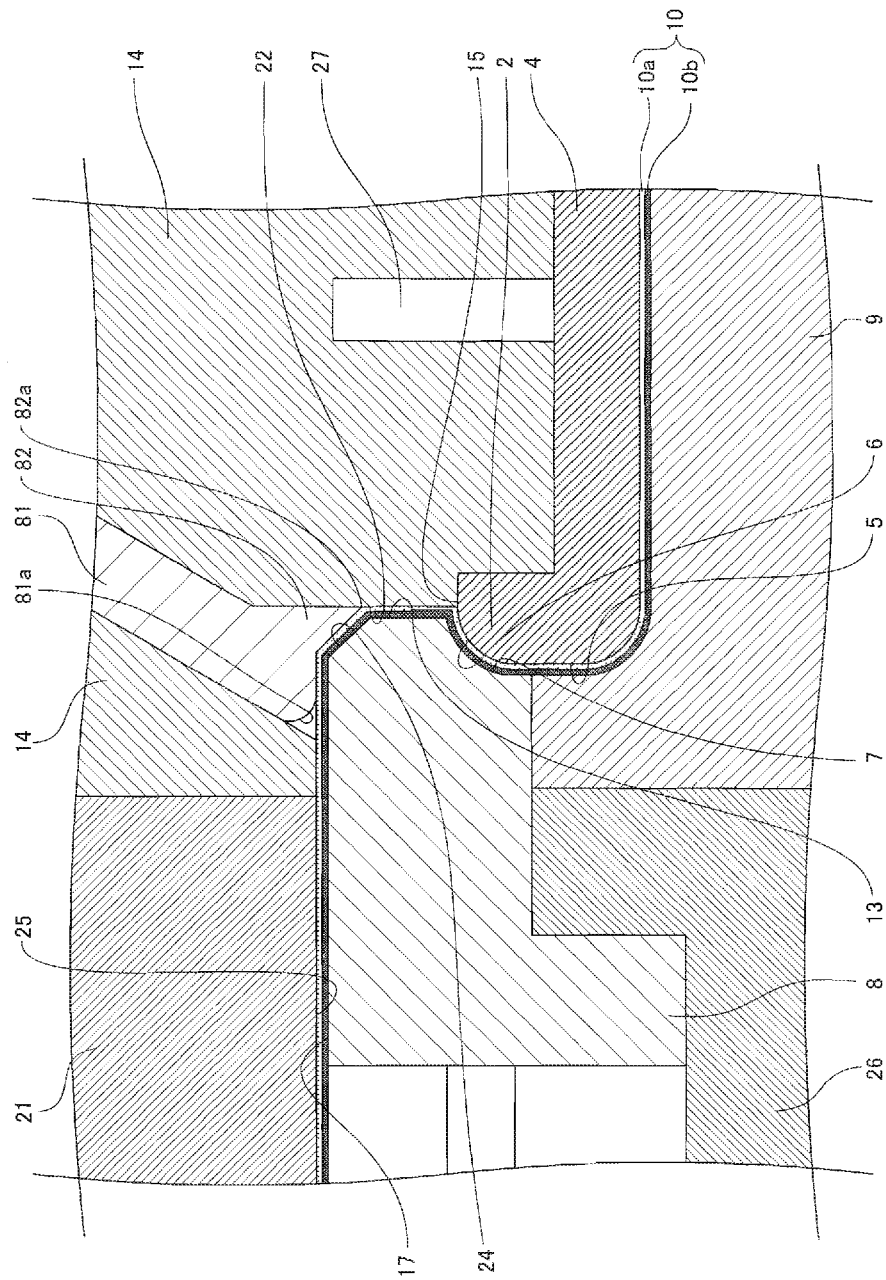
FIG. 18 is a partial enlarged sectional view illustrating an in-mold decoration die included in an in-mold system after the in-mold decoration die is closed according to a second embodiment.
Figure 19:
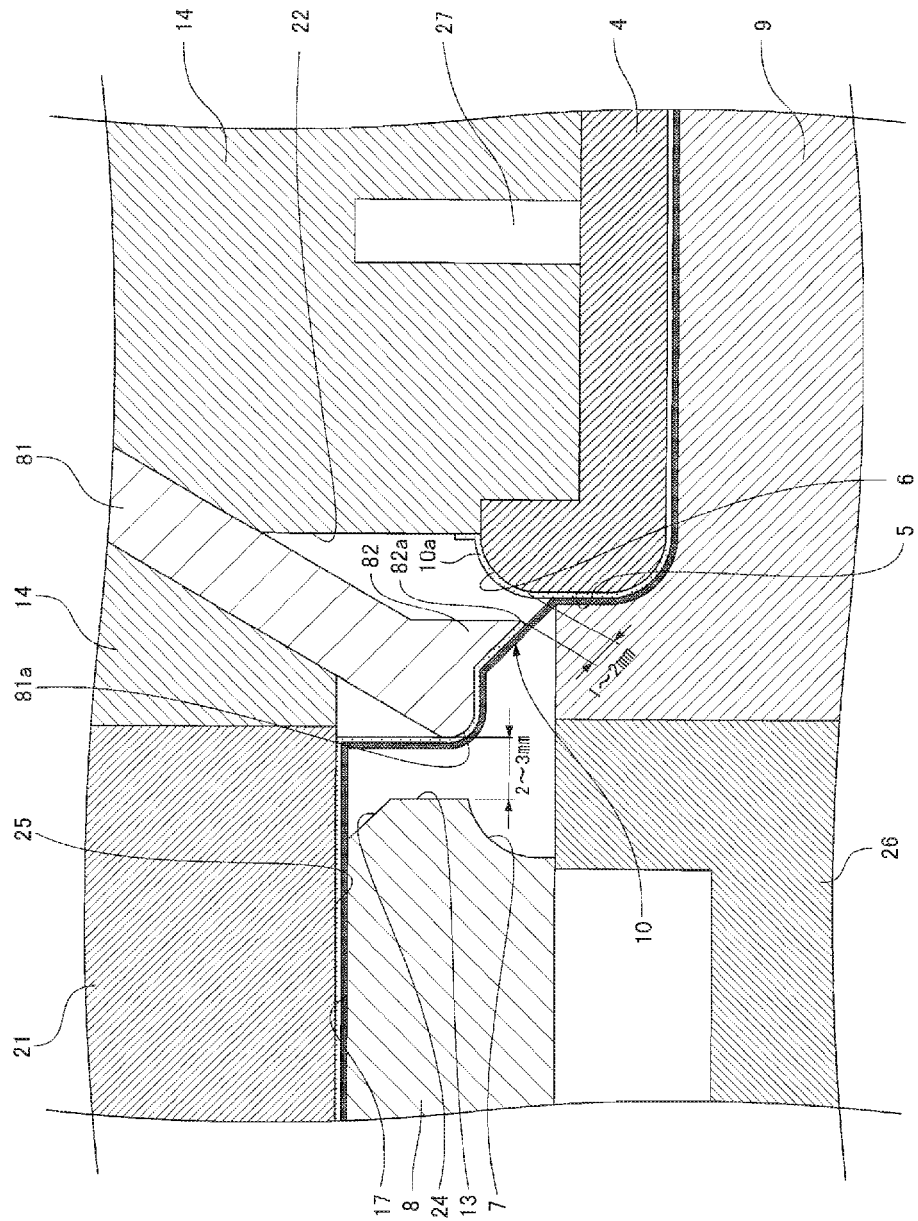
FIG. 19 is a partial enlarged sectional view illustrating the in-mold decoration die included in the in-mold system immediately before the in-mold decoration die is opened according to the second embodiment.

FIGS. 18 and 19 are both partial enlarged sectional views showing an in-mold decoration die provided in an in-mold system according to the second embodiment. Specifically, FIG. 18 illustrates the in-mold decoration die immediately before a slide core 8 retracts from a case molded article 4. FIG. 19 illustrates the in-mold decoration die immediately after the slide core 8 retracts from the case molded article 4.

In the second embodiment, the push pin 20 is replaced with a tilting pin 81 used for processing an undercut of a case molded article in a typical in-mold system. Specifically, as shown in FIGS. 18 and 19, the slide core 8 retracts, and then the tilting pin 81 is protruded diagonally downward from a divided surface 22 on a fixed-side die plate 21 to a movable-side die plate 26 so as to press foil 10. Thus, the foil 10 is pulled by a resultant force of a force applied perpendicularly to a mold opening direction and a force applied in the mold opening direction, and thus the foil 10 bonded to the outer surface of the case molded article 4 is peeled from an outer surface 5 of the case molded article 4 while leaving a pattern layer 10a, starting from the rounded end of a curved part 6 on the outer surface 5 of the case molded article 4. As in the first embodiment, the pattern layer 10a is preferably peeled off from the foil 10 at least on the upper end 6 of the outer surface of a rising wall 2 in the in-mold decoration die. In the second embodiment, the tilting pin 81 is provided in a mold fixed-side nest 14. As in the first embodiment, the divided surface 22 of the fixed-side die plate 21 is formed in the mold fixed-side nest 14 disposed on the fixed-side die plate 21.

In the second embodiment, as shown in FIGS. 18 and 19, the tilting pin 81 includes a wedge 82 having an end 82a. The wedge 82 protrudes diagonally downward so as to peel off the pattern layer 10a from the foil 10 with the end 82a. Thus, the pattern layer 10a can be more satisfactorily peeled off from the foil 10.

In the first embodiment, the corner 24 of the slide core 8 connecting the divided surface 13 and the die-plate divided surface 17 is a rounded edge. In contrast, the slide core 8 has a corner 24 that is an inclined surface in the second embodiment. The wedge 82 has an inclined surface that corresponds to the inclined surface of the slide core 8. Thus, when the in-mold decoration die is closed, the foil 10 is interposed between the inclined surface of a divided surface 13 of the slide core 8 and the inclined surface of the wedge 82.

When the tilting pin 81 is protruded, the foil 10 slides over an end face 81a of the tilting pin 81. Thus, the end face 81a of the tilting pin 81 is preferably rounded such that the foil 10 easily slides over the end face 81a of the tilting pin 81. This configuration is unlikely to break the foil 10.

The tilting pin 81 may be driven by a product ejecting mechanism (not shown) assembled to the fixed side of the in-mold decoration die. This configuration, however, requires an ejecting mechanism for driving the tilting pin 81 and an ejecting mechanism for driving an ejector pin 27 for removing the case molded article 4 from the convex cavity-forming surface of the fixed-side die plate 21. This is because the tilting pin 81 needs to protrude when the in-mold decoration die is closed. The tilting pin 81 and the ejector pin 27 may be driven by assembling a two-step ejecting mechanism to the fixed side of the in-mold decoration die.

Furthermore, the tilting pin 81 is preferably protruded such that the wedge 82 does not interfere with or come into contact with the pattern layer 10*a* peeled off from the foil 10 on the curved part 6 of the outer surface 5 of the case molded article 4. For example, as shown in FIG. 19, the protruding direction of the tilting pin 81 may be determined so as to have a minimum clearance of 1 mm to 2 mm between the end 82*a* of the wedge 82 and the curved part 6 of the outer surface 5 of the case molded article 4. The end 82*a* of the wedge 82 comes closest to the curved part 6 of the outer surface 5 of the case molded article 4 at a point where the curved part 6 of the outer surface 5 of the case molded article 4 tangentially matches with the protruding direction of the tilting pin 81.

Moreover, the slide core 8 may desirably retract such that the tilting pin 81 does not interfere with or come into contact with the slide core 8. For example, as shown in FIG. 19, a stroke for retraction of the slide core 8 may be determined so as to have a clearance of 2 mm to 3 mm between the end face 81*a* of the tilting pin 81 and the divided surface 13 of the slide core 8 at the completion of protrusion of the tilting pin 81. The end face 81*a* of the tilting pin 81 comes closest to the divided surface 13 of the slide core 8 at a point where the rounded end face 81*a* of the tilting pin 81 tangentially matches with the mold opening direction.

The operations of the in-mold decoration die configured thus will be described below.

In the second embodiment, when the in-mold decoration die is closed, the tilting pin 81 provided on the fixed-side die plate 21 retracts. At this point, the wedge 82 is in contact with the divided surface 22 of the fixed-side die plate 21 while the lowermost part of the end face 81*a* of the tilting pin 81 is aligned with a die-plate divided surface 25 of the fixed-side die plate 21. Moreover, the foil 10 at this point is interposed between the divided surface 13 of the slide core 8 provided from the rounded end of the curved part 6 on the outer surface 5 of the case molded article 4 in the mold opening direction and the divided surface 22 of the fixed-side die plate 21, the divided surface 22 facing the divided surface 13 of the slide core 8; meanwhile, the foil 10 is interposed between the inclined surface of the wedge 82 and the inclined surface of the corner 24 of the slide core 8. As has been discussed in the first embodiment, the rounded end of the curved part 6 on the outer surface 5 of the case molded article 4 corresponds to the rounded end of a curved cavity-forming surface 7 on the slide core 8.

After the slide core 8 retracts, the ejecting mechanism of a first stage protrudes the tilting pin 81. Thus, the end 82*a* of the wedge 82 is protruded so as to peel off the foil 10 from the case molded article 4. As has been discussed in the first embodiment, the foil 10 includes a base film and the pattern layer 10*a* formed on a release layer provided on the base film. Only a base layer including the base film and the release layer is peeled off from the case molded article 4 by the peeling effect of the wedge 82.

After the completion of the protrusion of the tilting pin 81 by the ejecting mechanism of the first stage, the in-mold decoration die is opened with the protruded tilting pin 81. After the in-mold decoration die is opened, the ejector pin 27 is protruded from the convex cavity-forming surface of the fixed-side die plate 21 by the ejecting mechanism of a second stage. This removes the case molded article 4 from the convex cavity-forming surface. The case molded article 4 removed from the convex cavity-forming surface is collected from the in-mold decoration die. Subsequently, the two-step ejecting mechanism sequentially returns the ejector pin 27 and the tilting pin 81 to the respective original positions.

The foil 10 is then released from a foil retaining plate 16 (not shown). After that, the long foil 10 is fed to locate a subsequent predetermined design on the foil 10 to a predetermined position between the movable-side die plate 26 and the fixed-side die plate 21. Thus, the in-mold decoration die is prepared for subsequent molding.

Subsequently, the slide core 8 moves forward to return to a predetermined position. The foil retaining plate 16 (not shown) then moves to the movable-side die plate 26 to press the foil 10 to a die-plate divided surface 17 of the movable-side die plate 26. Thus, the foil 10 is fixed.

The foil 10 is then stretched by, for example, vacuum suction into a dented cavity-forming surface for forming the outside shape of the case molded article 4, extending a part of the long foil 10 along the dented cavity-forming surface.

Subsequently, the movable-side die plate 26 and the fixed-side die plate 21 are closed to form a cavity. After that, molten resin (not shown) is injected into the cavity so as to fill the cavity with the molten resin. After the completion of injection of the molten resin, the resin in the cavity is cooled in a cooling process. This solidifies the resin so as to form the case molded article 4. At this point, the foil 10 in the cavity is joined to the outer surface of the case molded article 4.

Figure 20:
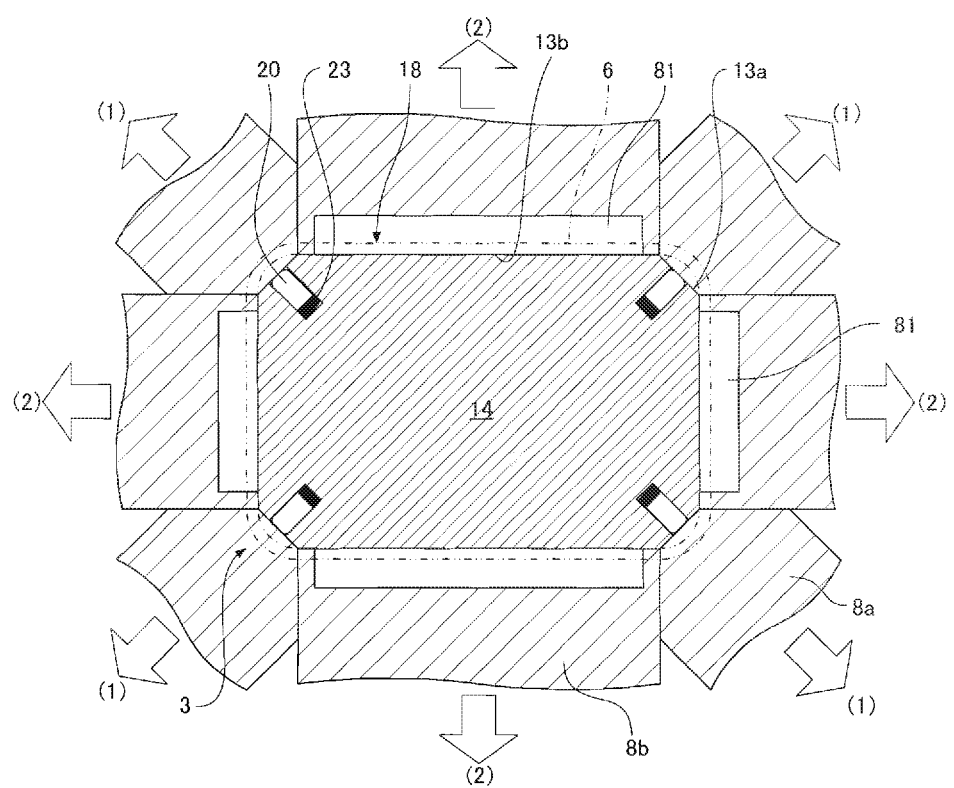
FIG. 20 is a sectional view for explaining the layout of slide cores and tilting pins according to the second embodiment.

FIG. 20 is a sectional view for explaining the layout of the slide cores 8 and the tilting pins 81 according to the second embodiment. As shown in FIG. 20, the tilting pins 81 are provided on respective linear parts 18 on the rising wall 2 of the case molded article 4.

As has been discussed in the first embodiment, in the case where the push pins 20 are disposed around the case molded article 4, the push pins 20 need to be located at regular intervals around the case molded article 4. As the area of a bottom 11 of the case molded article 4 increases, the required number of the push pins 20 increases. In the second embodiment, as shown in FIG. 20, the tilting pins 81 are arranged along the respective linear parts 18 of the case molded article 4. The tilting pin 81 is provided substantially over the corresponding linear part 18 along the longitudinal direction of the linear part 18. The tilting pin 81 is substantially as long as the corresponding linear part 18 of the case molded article 4 along the outside shape of the case molded article 4. Thus, even if the case molded article 4 has a large area, the pattern layer 10*a* bonded to the outer surface of the case molded article 4 is efficiently peeled off from the foil 10.

As in the first embodiment, slide cores 8*a* are disposed for respective corners 3 of the rising wall 2 of the case molded article 4 while the push pins 20 are disposed for the respective slide cores 8*a*. Thus, as in the first embodiment, in the step of retracting the slide cores 8 from the case molded article 4, the four slide cores 8*a* for forming the respective curved parts 6 on the four corners 3 are first preferably retracted at the same time. The foil 10 is most stretched on the four corners 3. In this configuration, at least on the upper ends 6 of the outer surfaces of the corners 3, the foil 10 is first peeled off from the surface of the case molded article 4 while leaving the pattern layer 10*a* as illustrated in FIG. 4. Subsequently, the four slide cores 8*b* for forming the curved parts 6 of the four linear parts 18 simultaneously retract. After that, the four tilting pins 81 for the four linear parts 18 are simultaneously protruded. Thus, as illustrated in FIGS. 18 and 19, at least on the upper end 6 of the outer surface of the linear part 18, the foil 10 is peeled off from the surface of the case molded article 4 while leaving the pattern layer 10a.

The slide cores 8a provided for the corners 3 first retract to peel off the pattern layer 10a from the foil 10 on the corners 3 where the foil is most likely to break. The pattern layer 10a starts peeling off from the rounded ends of the curved parts 6 on the outer surfaces of the corners 3. Thus, the foil is less likely to break than in the case where the pattern layer is simultaneously peeled off from the foil over the outer surface of the case molded article when the in-mold decoration die is opened. The pattern layer 10a is peeled off on the corners 3 by a resultant force of a force applied perpendicularly to the mold opening direction and a force applied in the mold opening direction. The pattern layer 10a is peeled off from the foil 10 at least on the upper ends 6 of the outer surfaces of the corners 3.

After the completion of retraction of the slide cores 8, the tilting pins 81 are protruded to peel off the pattern layer 10a from the foil 10 at least on the curved parts 6 on the outer surfaces of the linear parts 18 of the case molded article 4 by the ends 82a of the wedges 82 on the tilting pins 81 before the in-mold decoration die is opened. Thus, when the in-mold decoration die is opened, the foil 10 does not overlap the curved part 6 on the outer surface 5 of the case molded article 4. This allows the case molded article 4 to be collected from the in-mold decoration die without damaging a design transferred to the curved part 6. As in the first embodiment, the curved part 6 corresponds to the upper end of the outer surface 5 of the case molded article 4, that is, the upper end of the outer surface of the rising wall 2 of the case molded article 4. The curved part 6 is undercut in the mold opening direction of the in-mold decoration die.

Third Embodiment

Differences in a third embodiment from the first and second embodiments will be described below.

Figure 21:
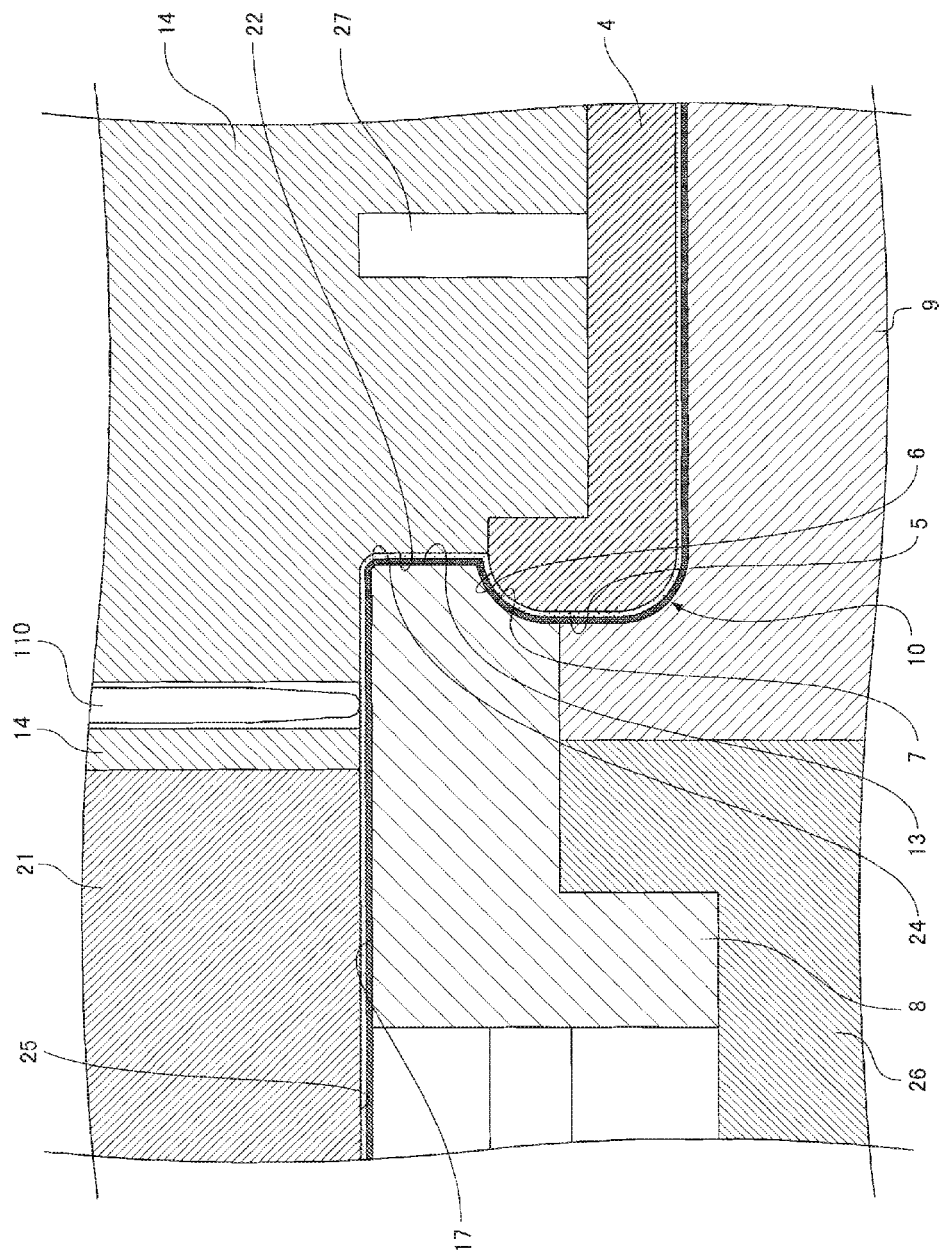
FIG. 21 is a partial enlarged sectional view illustrating an in-mold decoration die included in an in-mold system after the in-mold decoration die is closed according to a third embodiment.
Figure 22:
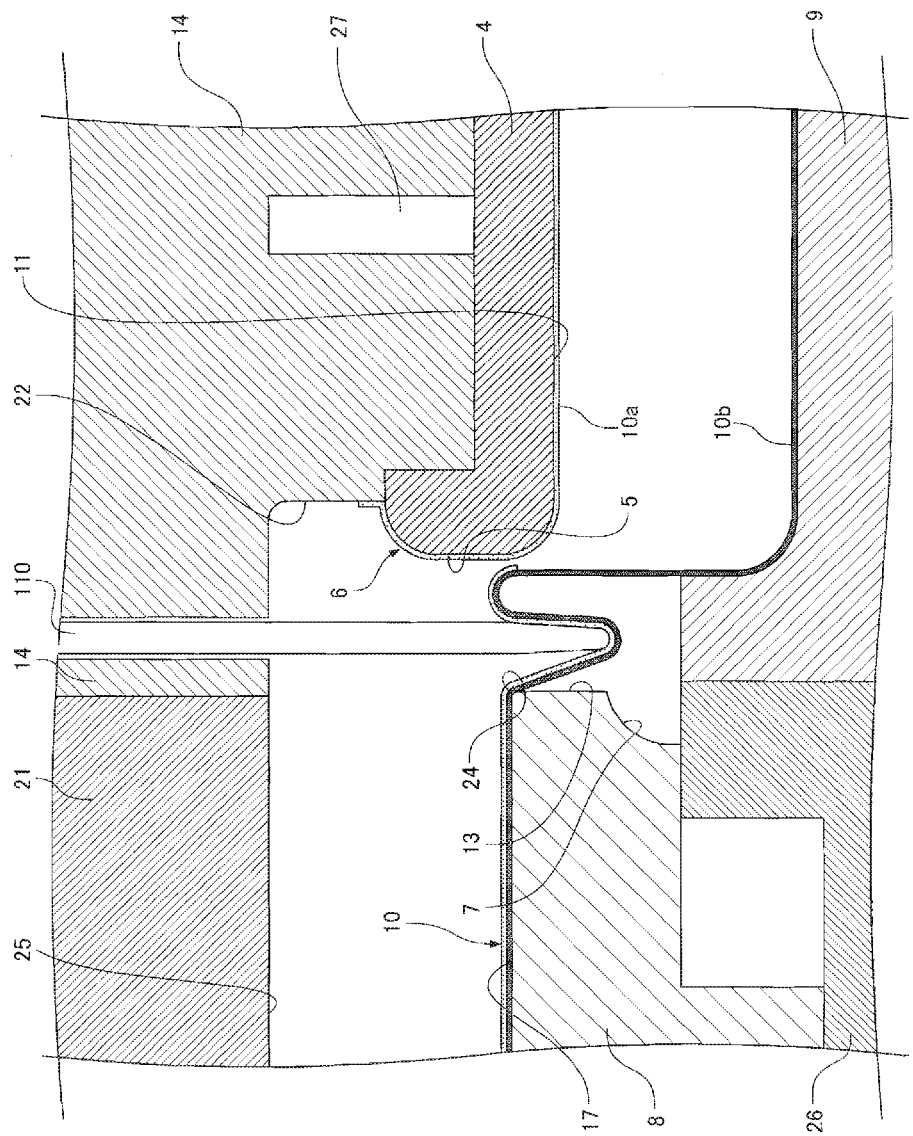
FIG. 22 is a partial enlarged sectional view illustrating the in-mold decoration die being opened according to the third embodiment.

FIGS. 21 and 22 are both partial enlarged sectional views showing an in-mold decoration die provided in an in-mold system according to the third embodiment. Specifically, FIG. 21 shows the in-mold decoration die immediately before a slide core 8 retracts from a case molded article 4. FIG. 22 illustrates the in-mold decoration die being opened.

In the third embodiment, the tilting pin 81 is replaced with a stick 110 vertically protruding from a die-plate divided surface 25 of a fixed-side die plate 21. In other words, the stick 110 peels off a pattern layer 10a from foil 10 at least on an upper end 6 of an outer surface 5 of the case molded article 4. Even if the tilting pin 81 and a mechanism for protruding the tilting pin 81 diagonally downward from a divided surface 22 of the fixed-side die plate 21 cannot be structurally provided, the stick 110 and a mechanism for vertically protruding the stick 110 from the die-plate divided surface 25 of the fixed-side die plate 21 can be provided.

The stick 110 fit into the fixed-side die plate 21 starts protruding immediately after the slide core 8 retracts or when the in-mold decoration die is opened.

The stick 110 protrudes to press the foil 10 perpendicularly to a die-plate divided surface 17 of a movable-side die plate 26. Thus, the foil 10 is pulled by a resultant force of a force applied perpendicularly to a mold opening direction and a force applied in the mold opening direction, and thus the foil 10 bonded to the outer surface of the case molded article 4 is peeled off from the outer surface 5 of the case molded article 4 while leaving the pattern layer 10a, starting from the rounded end of the curved part 6 on the outer surface 5 of the case molded article 4. In the third embodiment, the stick 110 is fit into a mold fixed-side nest 14. The stick 110 may be fit into the matrix of the fixed-side die plate 21.

When the stick 110 is protruded, the foil 10 slides on the end face of the stick 110. Thus, the stick 110 preferably has a circular end face to facilitate sliding of the foil 10 on the end face, reducing the occurrence of breaks on the foil 10.

As in the first embodiment, the edge of a corner 24 on the slide core 8 is rounded. Thus, when the foil 10 is stretched by, for example, vacuum suction into a dented cavity-forming surface for forming the outside shape of the case molded article 4, the foil 10 satisfactorily slides on the edge of the corner 24.

Preferably, the stroke of the stick 110, the timing for starting the protrusion of the stick 110, and the protruding speed of the stick 110 are determined so as to press the foil 10 beyond a die-plate divided surface 17 of the movable-side die plate 26 that is moved away from the fixed-side die plate 21 when the in-mold decoration die is opened. This configuration prevents damage on a design transferred to the curved part 6 that is undercut in the mold opening direction of the in-mold decoration die when the in-mold decoration die is opened. For example, the stroke of the stick 110, the timing for starting the protrusion of the stick 110, and the protruding speed of the stick 110 may be determined such that the end of the stick 110 protrudes from a bottom 11 of the case molded article 4 by about 3 mm to 5 mm when the rounded end of the curved part 6 on the outer surface 5 of the case molded article 4 is drawn from the die-plate divided surface 17 of the movable-side die plate 26.

The operations of the in-mold decoration die configured thus will be described below.

In the third embodiment, when the in-mold decoration die is closed, the foil 10 is interposed between a divided surface 13 of the slide core 8 and the divided surface 22 of the fixed-side die plate 21, the divided surface 13 provided in the mold opening direction from the rounded end of the curved part 6 on the outer surface 5 of the case molded article 4, the divided surface 22 facing the divided surface 13 of the slide core 8. At this point, the stick 110 provided in the mold fixed-side nest 14 is accommodated in a hole formed on the mold fixed-side nest 14. As has been discussed in the first embodiment, the rounded end of the curved part 6 on the outer surface 5 of the case molded article 4 corresponds to the rounded end of a curved cavity-forming surface 7 of the slide core 8.

The stick 110 starts protruding immediately after the retraction of the slide core 8 or when the in-mold decoration die starts opening, allowing the stick 110 to vertically protrude from the die-plate divided surface 25 of the fixed-side die plate 21. To adjust the timing for starting the protrusion of the stick 110, a cylinder is desirably used as a driving source of the stick 110.

The stick 110 is protruded to press the foil 10 perpendicularly to the die-plate divided surface 17 of the movable-side die plate 26. As has been discussed, the foil 10 bonded to the outer surface of the case molded article 4 is peeled off from the outer surface 5 of the case molded article 4 while leaving the pattern layer 10a, starting from the rounded end of the curved part 6 on the outer surface 5 of the case molded article 4. As has been discussed in the first embodiment, the foil 10 includes a base film and the pattern layer 10a formed on a release layer provided on the base film.

Even when the protrusion of the stick 110 is completed, the in-mold decoration die is not fully opened. In other words, at the completion of the protrusion of the stick 110, the in-mold decoration die is being opened. The in-mold decoration die continues to open with the protruded stick 110 so as to remove the foil 10 from the end face of the stick 110. After the completion of opening of the in-mold decoration die, the stick 110 is returned to an original position. The following steps are identical to those of the first embodiment and thus the explanation thereof is omitted.

Figure 23:
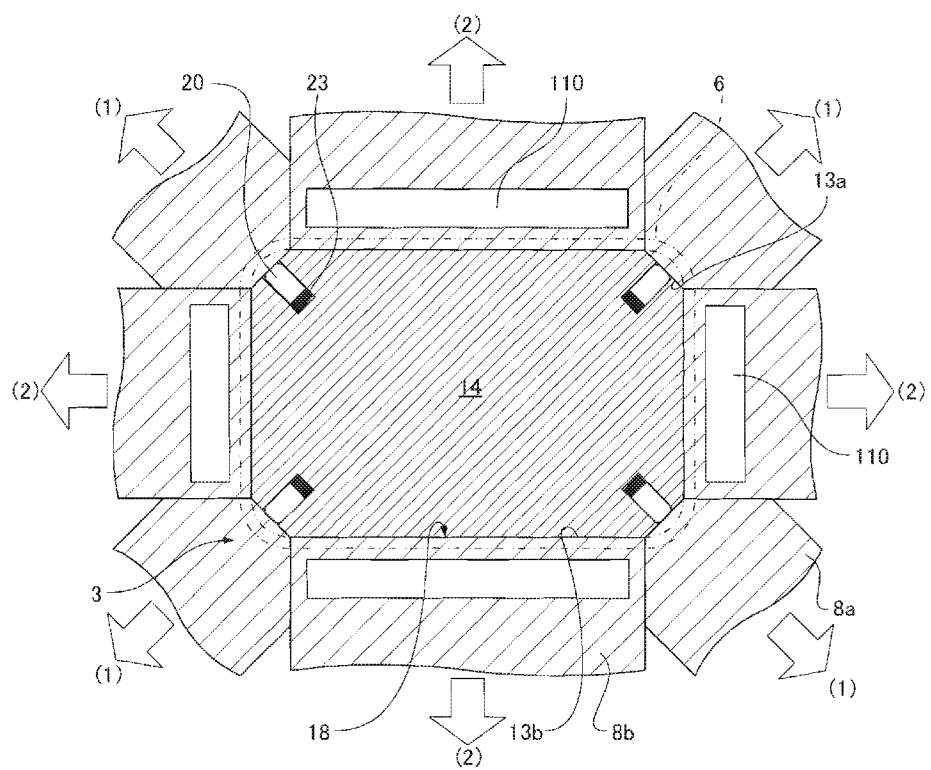
FIG. 23 is a sectional view for explaining the layout of slide cores and sticks according to the third embodiment.
Figure 24:
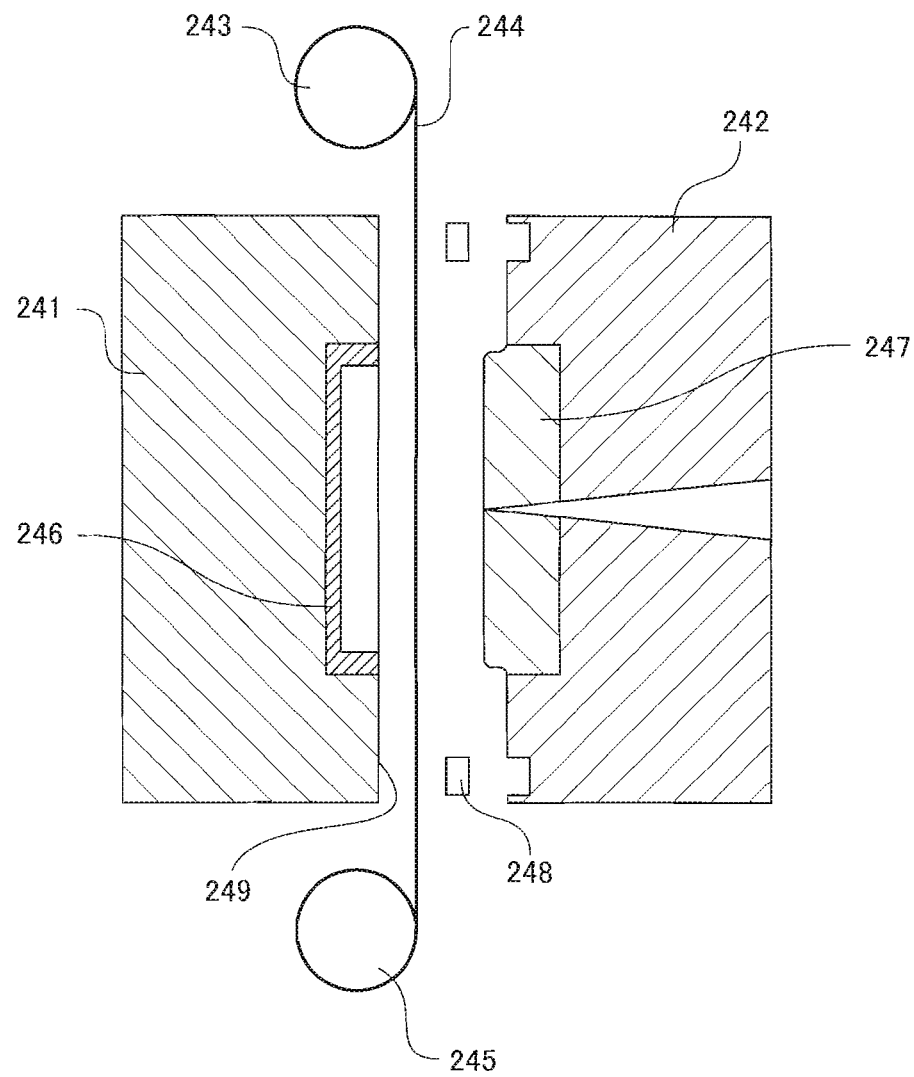
FIG. 24 is a sectional view of a typical in-mold system.
Figure 25:
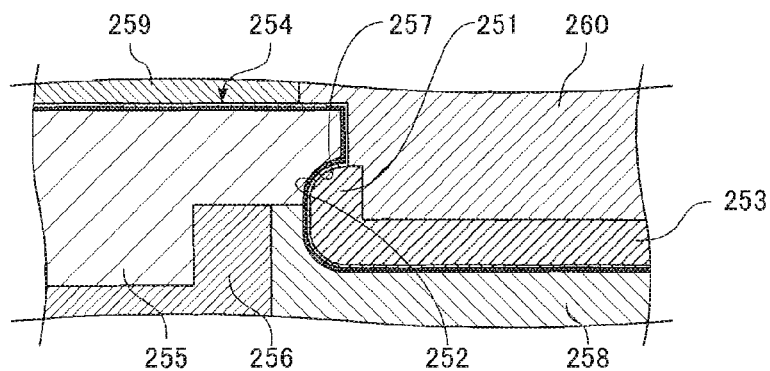
FIG. 25 is a process partial enlarged sectional view showing an operation of the typical in-mold system.
Figure 26:
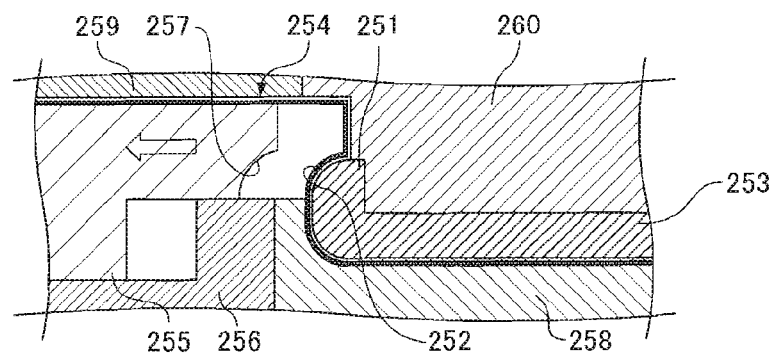
FIG. 26 is a process partial enlarged sectional view showing an operation of the typical in-mold system.

FIG. 23 is a sectional view for explaining the layout of the slide cores 8 and the sticks 110 according to the third embodiment. As shown in FIG. 23, the sticks 110 are provided on respective linear parts 18 on a rising wall 2 of the case molded article 4.

As has been discussed in the first embodiment, in the case where push pins 20 are disposed around the case molded article 4, the push pins 20 need to be located at regular intervals around the case molded article 4. As the area of the bottom 11 of the case molded article 4 increases, the required number of the push pins 20 increases. In the third embodiment, as shown in FIG. 23, the sticks 110 are arranged along the respective linear parts 18 of the case molded article 4. The stick 110 is provided substantially over the corresponding linear part 18 along the longitudinal direction of the linear part 18. The stick 110 is substantially as long as the corresponding linear part 18 of the case molded article 4 along the outside shape of the case molded article 4. Thus, even if the case molded article 4 has a large area, the pattern layer 10a bonded to the outer surface of the case molded article 4 is efficiently peeled off from the foil 10.

As in the first embodiment, slide cores 8a are disposed for respective corners 3 of the rising wall 2 of the case molded article 4 while the push pins 20 are disposed for the respective slide cores 8a. Thus, as in the first embodiment, in the step of retracting the slide cores 8 from the case molded article 4, the four slide cores 8a for forming the respective curved parts 6 on the four corners 3 are first preferably retracted at the same time. The foil 10 is most stretched on the four corners 3. In this configuration, at least on the upper ends 6 of the outer surfaces of the corners 3, the foil 10 is first peeled off from the surface of the case molded article 4 while leaving the pattern layer 10a as illustrated in FIG. 4. Subsequently, four slide cores 8b for forming the curved parts 6 of the four linear parts 18 simultaneously retract. After that, the four sticks 110 for the four linear parts 18 are vertically protruded at the same time from the die-plate divided surface 25 of the fixed-side die plate 21. Thus, as illustrated in FIGS. 21 and 22, at least on the upper end 6 of the outer surface of the linear part 18, the foil 10 is peeled off from the surface of the case molded article 4 while leaving the pattern layer 10a.

The slide cores 8a provided for the corners 3 first retract to peel off the pattern layer 10a from the foil 10 on the corners 3 where the foil is most likely to break. The pattern layer 10a starts peeling off from the rounded ends of the curved parts 6 on the outer surfaces of the corners 3. Thus, the foil 10 is less likely to break than in the case where the pattern layer is simultaneously peeled off from the foil over the outer surface of the case molded article when the in-mold decoration die is opened. The pattern layer 10a is peeled off on the corners 3 by a resultant force of a force applied perpendicularly to the mold opening direction and a force applied in the mold opening direction. The pattern layer 10a is peeled off from the foil 10 at least on the upper ends 6 of the outer surfaces of the corners 3.

After the completion of retraction of the slide cores 8 or when the in-mold decoration die starts opening, the stick 110 starts protruding vertically from the die-plate divided surface 25 of the fixed-side die plate 21, pressing the foil 10 below the die-plate divided surface 17 of the movable-side die plate 26 moving away from the fixed-side die plate 21. Thus, the pattern layer 10a is peeled off from the foil 10 at least on the curved parts 6 on the outer surfaces of the linear parts 18. The overlapping foil 10 can be released from the rising wall 2 of the case molded article 4 before the rising wall 2 pushes up the foil 10 overlapping the curved part 6. This allows the case molded article 4 to be collected from the in-mold decoration die without damaging a design transferred to the curved part 6. As in the first embodiment, the curved part 6 corresponds to the upper end of the outer surface 5 of the case molded article 4, that is, the upper end of the outer surface of the rising wall 2 of the case molded article 4. The curved part 6 is undercut in the mold opening direction of the in-mold decoration die.

In the first embodiment, the foil 10 is pressed to the divided surface 13 of the retracting slide core 8 in the retracting direction of the slide core 8. In the second embodiment, the foil 10 is pressed diagonally downward from the divided surface 22 of the fixed-side die plate 21. In the third embodiment, the foil 10 is pressed perpendicularly to the die-plate divided surface 17 of the movable-side die plate 26. A press on the foil 10 is maximized in the third embodiment and thus the foil 10 pressed by the stick 110 may be broken. In the third embodiment, a heating medium is preferably assembled into the slide core 8. The heating medium further extends the foil 10 with higher durability.

Conventionally, it is difficult to apply a design over the primary outer surface of a resin molded article. The in-mold decorating methods and the in-mold systems according to the first to third embodiments can apply a design over the primary outer surface of a resin molded article. Hence, the in-mold decorating methods and the in-mold systems according to the first to third embodiments can increase the quality and texture of products such as a television, a personal computer, and a cellular phone.

Furthermore, the in-mold decorating methods and the in-mold systems according to the first to third embodiments can prevent breaks on foil. Hence, the in-mold decorating methods and the in-mold systems according to the first to third embodiments can contribute to high-yield production.

Having specifically described exemplary embodiments of the present invention, it is easily understood by those skilled in the art that various changes can be made in the exemplary embodiments without substantially departing from the new teachings of the present invention and the effect of the present invention. Thus, these changes are intended to be embraced in the scope of the present invention.

What is claimed is:

1. An in-mold decorating method comprising:
   a first step of joining foil to a surface of a case molded article while molding the case molded article by injecting resin into a molding space formed in an in-mold decoration die;
   a second step of peeling the foil from the surface of the case molded article while leaving a pattern layer at least on upper ends of corners of a rising wall on the case molded article,
   wherein in the second step, a first push pin presses the foil to a divided surface of a first slide core while the first slide core assembled to the in-mold decoration die retracts, the first slide core forming a surface of the corner into a predetermined shape; and a third step of peeling the foil from the surface of the case molded article while leaving the pattern layer at points other than points where the foil is peeled off in the second step.

2. The in-mold decorating method according to claim 1, wherein in the third step,
the foil is first peeled off from the surface of the case molded article while leaving the pattern layer at least on the upper end of the rising wall other than the corners, and
the foil is peeled off from the surface of the case molded article while leaving the pattern layer at other points where the foil is joined to the surface of the case molded article.

3. The in-mold decorating method according to claim 2, wherein in the third step, a second push pin presses the foil to a divided surface of a second slide core while the second slide core assembled to the in-mold decoration die retracts, the second slide core forming a surface of the rising wall other than the corners into a predetermined shape.

4. The in-mold molding method according to claim 2, wherein in the third step, a second slide core assembled to the in-mold decoration die retracts, the second slide core forming a surface of the rising wall other than the corners into a predetermined shape, and then a tilting pin is diagonally protruded from a divided surface of the in-mold decoration die facing a divided surface of the second slide core so as to press the foil.

5. The in-mold molding method according to claim 2, wherein in the third step, after a second slide core assembled to the in-mold decoration die retracts, the second slide core forming a surface of the rising wall other than the corners into a predetermined shape, or when the in-mold decoration die starts opening, a stick is protruded from a die-plate divided surface of the in-mold decoration die so as to press the foil.

6. The in-mold decorating method according to claim 1, wherein the rising wall of the case molded article has a rounded upper end surface.

7. The in-mold decorating method according to claim 1, wherein the rising wall of the case molded article has an upper end surface which is undercut in a mold opening direction of the in-mold decoration die.

* * * * *